US012593291B2

(12) United States Patent
Zhang et al.

(10) Patent No.: US 12,593,291 B2
(45) Date of Patent: Mar. 31, 2026

(54) SYNCHRONIZATION STATE PROCESSING METHOD, AND DEVICE AND STORAGE MEDIUM

(71) Applicant: DATANG MOBILE COMMUNICATIONS EQUIPMENT CO., LTD., Beijing (CN)

(72) Inventors: Bufang Zhang, Beijing (CN); Jing Fu, Beijing (CN); Jianxiang Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 315 days.

(21) Appl. No.: 18/260,782

(22) PCT Filed: Jan. 4, 2022

(86) PCT No.: PCT/CN2022/070092
§ 371 (c)(1),
(2) Date: Jul. 7, 2023

(87) PCT Pub. No.: WO2022/148339
PCT Pub. Date: Jul. 14, 2022

(65) Prior Publication Data
US 2024/0306101 A1      Sep. 12, 2024

(30) Foreign Application Priority Data
Jan. 8, 2021      (CN) .......................... 202110024676.4

(51) Int. Cl.
*H04W 76/27*      (2018.01)
*H04L 5/00*      (2006.01)
(Continued)

(52) U.S. Cl.
CPC ......... *H04W 56/001* (2013.01); *H04L 5/0048* (2013.01); *H04W 76/27* (2018.02); *H04W 74/0833* (2013.01); *H04W 74/0836* (2024.01)

(58) Field of Classification Search
CPC .............................. H04L 12/50; H04L 12/28
(Continued)

(56) References Cited

U.S. PATENT DOCUMENTS

2016/0157218 A1* 6/2016 Nam .................... H04B 7/0639
                                                            370/329
2019/0132809 A1    5/2019 Tsuboi et al.
(Continued)

FOREIGN PATENT DOCUMENTS

CN      105992347 A      10/2016
CN      108882260 A      11/2018
CN      110896560 A      3/2020

OTHER PUBLICATIONS

Oppo,"Discussion on positioning in RRC Inactive/Idle mode", 3GPP TSG-RAN WG2 Meeting #112 electronic, Online, Nov. 2020, total 3 pages, R2-2008776.
(Continued)

*Primary Examiner* — Dang T Ton
(74) *Attorney, Agent, or Firm* — KILPATRICK TOWNSEND & STOCKTON LLP

(57) ABSTRACT

The present disclosure relates to the field of communications. Disclosed are a synchronization state processing method, and a device and a storage medium. The method comprises: during the process of a terminal in an idle state or an inactive state transmitting an SRS to a base station for uplink positioning, the terminal or the base station acquires channel state information of a transmission channel between the terminal and the base station, and detecting, on the basis of the channel state information, a synchronization state between the terminal, which is performing idle-state or
(Continued)

A base station determines a synchronization state with a terminal in a process of receiving an SRS transmitted by the terminal, where the terminal is in the IDLE state or INACTIVE state ⟿ 300

The base station re-establishes synchronization with the terminal in the INACTIVE state to continue receiving the SRS transmitted by the terminal, or determines that positioning fails and generates a second positioning failure indication, if it is determined that uplink out-of-synchronization with the terminal occurs ⟿ 301 inactive-state uplink positioning, and the base station; and when uplink out-of-synchronization is detected, the terminal or the base station uses a corresponding processing approach to continue to guarantee the subsequent idle/inactive positioning process flow.

20 Claims, 4 Drawing Sheets

(51) Int. Cl.
*H04W 56/00* (2009.01)
*H04W 74/0833* (2024.01)
*H04W 74/0836* (2024.01)

(58) Field of Classification Search
USPC ................................. 370/329, 401, 402, 403
See application file for complete search history.

(56) References Cited

U.S. PATENT DOCUMENTS

2020/0053824 A1 2/2020 He
2025/0008509 A1* 1/2025 Ahmed ................. H04W 72/21

OTHER PUBLICATIONS

Vivo,"Discussion on UE based positioning in idle/inactive states", 3GPP TSG RAN WG1 #97, Reno, USA, May 13-17, 2019, total 2 pages, R1-1906181.

* cited by examiner

SYNCHRONIZATION STATE PROCESSING METHOD, AND DEVICE AND STORAGE MEDIUM

CROSS-REFERENCE TO RELATED APPLICATIONS

The disclosure is a National Stage of International Application No. PCT/CN2022/070092, filed Jan. 4, 2022, which claims priority to Chinese Patent Application No. 202110024676.4, filed with the China National Intellectual Property Administration on Jan. 8, 2021 and entitled "Synchronization State Processing Method and Device, and Storage Medium", the entire content of which is hereby incorporated by reference.

FIELD

The disclosure relates to communication technologies, and particularly to a synchronization state processing method and device, and a storage medium.

BACKGROUND

Uplink synchronization refers to a process in which uplink signals of terminals in one cell using different positions of the same slot reach the receiving antenna of a base station at the same time. That is, the signals of different terminals in the same slot are kept synchronized in arriving at the receiving antenna of the base station. The purpose of uplink synchronization is to reduce the uplink multiple access interference and multipath interference between terminals in the cell, and increase the capacity and radius of the cell.

When a terminal does not access the network, the terminal can only establish a connection with the network by initiating a Random Access Channel (RACH) process, and realize uplink synchronization during this process. After a terminal accesses the network, the base station can determine the TA value of each terminal by measuring the uplink transmission of the terminal. Further, when a terminal needs to calibrate its uplink synchronization, the base station will send a Timing Advance Command (TAC) to the terminal, to request the terminal to adjust the uplink transmission moment.

A key in the uplink positioning mechanism is to maintain uplink synchronization to ensure the transmission of the uplink Sounding Reference Signal (SRS). If uplink synchronization fails to be maintained, the SRS sent by the terminal cannot be correctly received and measured by the serving base station and other Transmission Reception Point (TRP), to result in the decreased positioning accuracy or even positioning failure. The RAT-related uplink positioning method is introduced in R16, including Uplink Time Difference of Arrival (UL-TDOA) and Uplink Angle of Arrival (UL-AOA). In addition, the RAT-related uplink and downlink positioning method, i.e., Multi-cell Round-Trip Time positioning (Multi-RTT), is also introduced in R16. In these positioning methods, the serving base station and multiple TRPs may receive and measure the SRS transmitted by the terminal based on the assistance data information obtained from the Location Management Function (LMF), including measurements of Angle of Arrival (A-AoA), Zenith Angle of Arrival (Z-AoA), Uplink Relative Time of Arrival (RTOA) and Reference Signal Receiving Power (RSRP). The serving base station and multiple TRPs will transmit their measurement results to the LMF, and the LMF will calculate the final position based on the SRS measurement results and other configuration information.

However, with the advent of the 5G era, the R17 standard has also been applied. The IDLE-state or INACTIVE-state positioning is introduced in the R17 standard, to reduce the device power consumption, increase the maximum number of accessible positioning services in the network, and improve the network efficiency. However, there is no connection between the terminal and the network in IDLE-state or INACTIVE-state uplink positioning. In this case, it is impossible to determine whether the uplink synchronization between the terminal and the network in the uplink positioning mechanism is maintained, and it is impossible to determine how to continue to ensure the reliable transmission of SRS after uplink out-of-synchronization.

SUMMARY

Embodiments of the disclosure provide a synchronization state processing method and device, and a storage medium, which can be used to determine whether uplink out-of-synchronization occurs between a terminal and a base station during uplink positioning in the IDLE state or INACTIVE state, and take corresponding processing approaches to guarantee the progress of the positioning process when detecting uplink out-of-synchronization. The embodiments of the disclosure are as follows.

In a first aspect, a synchronization state processing method includes:

obtaining, by a terminal in an IDLE state or INACTIVE state, first channel state information of a transmission channel between the terminal and a base station in a process of transmitting an uplink SRS to the base station for uplink positioning; and determining, by the terminal, a synchronization state with the base station based on the first channel state information.

In one embodiment, the method further includes:

re-establishing synchronization with the base station and continuing to transmit the SRS, or determining that positioning fails and generating a first positioning failure indication, or giving up transmitting the SRS and waiting for performing a processing result of the base station, if the terminal determines that uplink out-of-synchronization with the base station occurs.

In one embodiment, before the terminal obtains the first channel state information of the transmission channel between the terminal and the base station, the method further includes:

obtaining, by the terminal, a first channel state threshold corresponding to the transmission channel, where the first channel state threshold includes at least one of a first path loss threshold, a first RSRP threshold or a first RSRP variation threshold.

In one embodiment, obtaining, by the terminal, the first channel state threshold of the transmission channel, includes:

obtaining, by the terminal, the pre-configured first channel state threshold from RRC information sent by the base station before transitioning from a connected state to the IDLE state or INACTIVE state; or pre-configuring, by the terminal, the first channel state threshold.

In one embodiment, obtaining, by the terminal, the first channel state information of the transmission channel between the terminal and the base station, and determining the synchronization state with the base station based on the first channel state information, includes:

if the terminal obtains a first path loss value of the transmission channel, determining that uplink out-of-synchronization with the base station occurs when determining that the first path loss value is greater than the first path loss threshold; or if the terminal obtains first RSRP of a downlink reference signal sent by the base station on the transmission channel, determining that uplink out-of-synchronization with the base station occurs when determining that the first RSRP does not reach the first RSRP threshold; or if the terminal obtains a first RSRP variation of RSRP of the downlink reference signal sent by the base station on the transmission channel, determining that uplink out-of-synchronization with the base station occurs when determining that the first RSRP variation is greater than the first RSRP variation threshold.

In one embodiment, obtaining, by the terminal, the first path loss value of the transmission channel, includes:

determining, by the terminal, first sending power of the downlink reference signal sent by the base station on the transmission channel;

determining, by the terminal, first receiving power of the downlink reference signal received on the transmission channel; and determining, by the terminal, the first path loss value of the transmission channel based on the first sending power and the first receiving power.

In one embodiment, obtaining, by the terminal, the first RSRP variation of the RSRP of the downlink reference signal sent by the base station on the transmission channel, includes:

determining, by the terminal, second RSRP of the downlink reference signal sent by the base station on the transmission channel at a first moment, where the first moment is a moment to start transmitting the SRS to the base station;

determining, by the terminal, third RSRP of the downlink reference signal sent by the base station on the transmission channel at a second moment, where the second moment is any moment after the first moment; and determining, by the terminal, the corresponding first RSRP variation based on the second RSRP and the third RSRP.

In one embodiment, re-establishing, by the terminal, synchronization with the base station and continuing to transmit the SRS, includes:

initiating, by the terminal, a random access process to the base station and obtaining an updated Timing Advance (TA) value, to re-establish synchronization with the base station and continue to transmit the SRS after establishing synchronization, where the terminal does not enter a connected state in the random access process; or continuing, by the terminal, to transmit the SRS after establishing connection with the base station.

In one embodiment, after the terminal determines that positioning fails, the method further includes:

performing, by the terminal, at least one of following operations:

stopping, by the terminal, transmitting the SRS;

discarding, by the terminal, SRS configuration information.

In one embodiment, after the terminal determines that positioning fails and generates the first positioning failure indication, the method further includes:

sending, by the terminal, the first positioning failure indication to the base station, and the base station sends the first positioning failure indication to a positioning server; or sending, by the terminal, the first positioning failure indication to the positioning server directly.

In one embodiment, sending, by the terminal, the first positioning failure indication to the base station, includes:

initiating, by the terminal, a random access process to the base station, and sending the first positioning failure indication carried in a four-step random access process message 3 Msg3 or two-step random access process message A MsgA in the random access process to the base station, where the terminal does not enter a connected state in the random access process; or sending, by the terminal, the first positioning failure indication to the base station through an RRC message or a Medium Access Control Control Element (MAC CE) after establishing connection with the base station.

In a second aspect, a synchronization state processing method includes:

determining, by a base station, a synchronization state with a terminal in a process of receiving an uplink SRS transmitted by the terminal, where the terminal is in an IDLE state or INACTIVE state; and re-establishing, by the base station, synchronization with the terminal in the INACTIVE state to continue receiving the SRS transmitted by the terminal, or determining that positioning fails and generating a second positioning failure indication, if it is determined that uplink out-of-synchronization with the terminal occurs.

In one embodiment, re-establishing, by the base station, synchronization with the terminal in the INACTIVE state to continue receiving the SRS transmitted by the terminal, includes:

continuing, by the base station, receiving the SRS transmitted by the terminal after establishing connection with the terminal; or sending, by the base station, a first paging message to the terminal, where the first paging message carries a TA value updated by the base station, and the terminal re-establishes synchronization with the base station based on the received TA value, and the terminal does not initiate a random access process and continues to transmit the SRS in the INACTIVE state after receiving the first paging message; or sending, by the base station, a second paging message to the terminal and the terminal initiates a random access process and obtains an updated TA value to re-establish synchronization with the base station, and issuing, by the base station, an RRC release indication and the terminal continues to transmit the SRS in the INACTIVE state; or sending, by the base station, a third paging message to the terminal, where the third paging message carries an instruction to perform IDLE or INACTIVE uplink positioning, and the terminal initiates a random access process and obtains an updated TA value to re-establish synchronization with the base station, and the terminal continues to transmit the SRS in the INACTIVE state.

In one embodiment, after the base station determines that current positioning fails and generates the second positioning failure indication, the method further includes:

sending, by the base station, the generated second positioning failure indication to the positioning server and/or the terminal in the INACTIVE state.

In one embodiment, sending, by the base station, the second positioning failure indication to the terminal in the INACTIVE state, includes:

sending, by the base station, the second positioning failure indication to the terminal to notify the terminal of positioning failure after establishing connection with the terminal; or sending, by the base station, a fourth paging message carrying the second positioning failure indication to the terminal to notify the terminal of current positioning failure, and the terminal does not initiate a random access process and continues keeping in the INACTIVE state after receiving the fourth paging message.

In one embodiment, the method further includes:

sending, by the base station, the second positioning failure indication to the terminal after establishing connection with the terminal, where the base station sends the second positioning failure indication in any one of following manners:

carrying, by the base station, the second positioning failure indication in an MAC CE;

carrying, by the base station, the second positioning failure indication in Downlink Control Information (DCI);

carrying, by the base station, the second positioning failure indication in an RRC message.

In a third aspect, a terminal includes:

a memory configured to store an executable computer program; and a processor configured to read the computer program in the memory to:

obtain first channel state information of a transmission channel between the terminal and a base station when the terminal is in an IDLE state or INACTIVE state and is in a process of transmitting an uplink SRS to the base station for uplink positioning; and determine a synchronization state with the base station based on the first channel state information.

In one embodiment, the processor is further configured to:

re-establish synchronization with the base station and continue to transmit the SRS, or determine that positioning fails and generate a first positioning failure indication, or give up transmitting the SRS and wait for performing a processing result of the base station, if it is determined that uplink out-of-synchronization with the base station occurs.

In one embodiment, before obtaining the first channel state information of the transmission channel between the terminal and the base station, the processor is further configured to:

obtain a first channel state threshold corresponding to the transmission channel, where the first channel state threshold includes at least one of a first path loss threshold, a first RSRP threshold or a first RSRP variation threshold.

In one embodiment, when obtaining the first channel state threshold of the transmission channel, the processor is configured to:

obtain the pre-configured first channel state threshold from RRC information sent by the base station before transitioning from a connected state to the IDLE state or INACTIVE state; or pre-configure the first channel state threshold.

In one embodiment, when obtaining the first channel state information of the transmission channel between the terminal and the base station, and determining the synchronization state with the base station based on the first channel state information, the processor is configured to:

if a first path loss value of the transmission channel is obtained, determine that uplink out-of-synchronization with the base station occurs when determining that the first path loss value is greater than the first path loss threshold; or if first RSRP of a downlink reference signal sent by the base station on the transmission channel is obtained, determine that uplink out-of-synchronization with the base station occurs when determining that the first RSRP does not reach the first RSRP threshold; or if a first RSRP variation of RSRP of the downlink reference signal sent by the base station on the transmission channel is obtained, determine that uplink out-of-synchronization with the base station occurs when determining that the first RSRP variation is greater than the first RSRP variation threshold.

In one embodiment, when obtaining the first path loss value of the transmission channel, the processor is configured to:

determine first sending power of the downlink reference signal sent by the base station on the transmission channel;

determine first receiving power of the downlink reference signal received on the transmission channel; and determine the first path loss value of the transmission channel based on the first sending power and the first receiving power.

In one embodiment, when obtaining the first RSRP variation of the RSRP of the downlink reference signal sent by the base station on the transmission channel, the processor is configured to:

determine second RSRP of the downlink reference signal sent by the base station on the transmission channel at a first moment, where the first moment is a moment to start transmitting the SRS to the base station;

determine third RSRP of the downlink reference signal sent by the base station on the transmission channel at a second moment, where the second moment is any moment after the first moment; and determine the corresponding first RSRP variation based on the second RSRP and the third RSRP.

In one embodiment, when re-establishing synchronization with the base station and continuing to transmit the SRS, the processor is configured to:

initiate a random access process to the base station and obtain an updated TA value, to re-establish synchronization with the base station and continue to transmit the SRS after establishing synchronization, where the terminal does not enter a connected state in the random access process; or continue to transmit the SRS after establishing connection with the base station.

In one embodiment, after determining that positioning fails, the processor is further configured to:

perform at least one of following operations:

stop transmitting the SRS;

discard SRS configuration information.

In one embodiment, after determining that positioning fails and generating the first positioning failure indication, the processor is further configured to:

send the first positioning failure indication to the base station, and the base station sends the first positioning failure indication to a positioning server; or send the first positioning failure indication to the positioning server directly.

In one embodiment, when sending the first positioning failure indication to the base station, the processor is configured to:

initiate a random access process to the base station, and send the first positioning failure indication carried in a random access process message 3 Msg3 or random access process message A MsgA in the random access process to the base station, where the terminal does not enter a connected state in the random access process; or send the first positioning failure indication to the base station through an RRC message or an MAC CE after establishing connection with the base station.

In a fourth aspect, a base station includes:

a memory configured to store an executable computer program; and a processor configured to read the computer program in the memory to:

determine a synchronization state with a terminal in an IDLE state or INACTIVE state when the base station is in a process of receiving an uplink SRS transmitted by the terminal; and re-establish synchronization with the terminal in the INACTIVE state to continue receiving the SRS transmitted by the terminal, or determine that positioning fails and generate a second positioning failure indication, if it is determined that uplink out-of-synchronization with the terminal occurs.

In one embodiment, when re-establishing synchronization with the terminal in the INACTIVE state to continue receiving the SRS transmitted by the terminal, the processor is configured to:

continue receiving the SRS transmitted by the terminal after establishing connection with the terminal; or send a first paging message to the terminal, where the first paging message carries a TA value updated by the base station, and the terminal re-establishes synchronization with the base station based on the received TA value, and the terminal does not initiate a random access process and continues to transmit the SRS in the INACTIVE state after receiving the first paging message; or send a second paging message to the terminal and the terminal initiates a random access process and obtains an updated TA value to re-establish synchronization with the base station, and issue an RRC release indication and the terminal continues to transmit the SRS in the INACTIVE state; or send a third paging message to the terminal, where the third paging message carries an instruction to perform IDLE or INACTIVE uplink positioning, and the terminal initiates a random access process and obtains an updated TA value to re-establish synchronization with the base station, and the terminal continues to transmit the SRS in the INACTIVE state.

In one embodiment, after determining that current positioning fails and generating the second positioning failure indication, the processor is configured to:

send the generated second positioning failure indication to the positioning server and/or the terminal in the INACTIVE state.

In one embodiment, when sending the second positioning failure indication to the terminal in the INACTIVE state, the processor is configured to:

send the second positioning failure indication to the terminal to notify the terminal of positioning failure after establishing connection with the terminal; or send a fourth paging message carrying the second positioning failure indication to the terminal to notify the terminal of current positioning failure, and the terminal does not initiate a random access process and continues keeping in the INACTIVE state after receiving the fourth paging message.

In one embodiment, the processor is further configured to:

send the second positioning failure indication to the terminal after establishing connection with the terminal, where the base station sends the second positioning failure indication in any one of following manners:

carrying the second positioning failure indication in an MAC CE;

carrying the second positioning failure indication in DCI;

carrying the second positioning failure indication in an RRC message.

In the fifth aspect, a terminal includes:

an obtaining device configured to obtain first channel state information of a transmission channel between the terminal and a base station in a process of transmitting an uplink SRS to the base station for uplink positioning in an IDLE state or INACTIVE state; and a determining device configured to determine a synchronization state with the base station based on the first channel state information.

In a sixth aspect, a base station includes:

a determining device configured to determine a synchronization state with a terminal in an IDLE state or INACTIVE state in a process of receiving an uplink SRS transmitted by the terminal; and a processing device configured to re-establish synchronization with the terminal in the INACTIVE state to continue receiving the SRS transmitted by the terminal, or determine that positioning fails and generate a second positioning failure indication, if it is determined that uplink out-of-synchronization with the terminal occurs.

In a seventh aspect, a computer readable storage medium is provided, where instructions in the storage medium, when executed by a processor, enable the processor to perform the method described in any one of implementations in the above-mentioned first aspect.

In an eighth aspect, a computer readable storage medium is provided, where instructions in the storage medium, when executed by a processor, enable the processor to perform the method described in any one of implementations in the above-mentioned second aspect.

To sum up, in the embodiments of the disclosure, when the terminal in the IDLE state or INACTIVE state transmits the SRS to the base station for uplink positioning, the terminal or the base station can obtain the channel state information of the transmission channel between the terminal and the base station, and detect the synchronization state between the terminal that is performing uplink positioning in the IDLE state or INACTIVE state and the base station based on the channel state information. When detecting the uplink out-of-synchronization, the terminal or the base station can take corresponding processing approaches to continue to guarantee the subsequent IDLE/INACTIVE positioning process.

DETAILED DESCRIPTION

Figure 1:
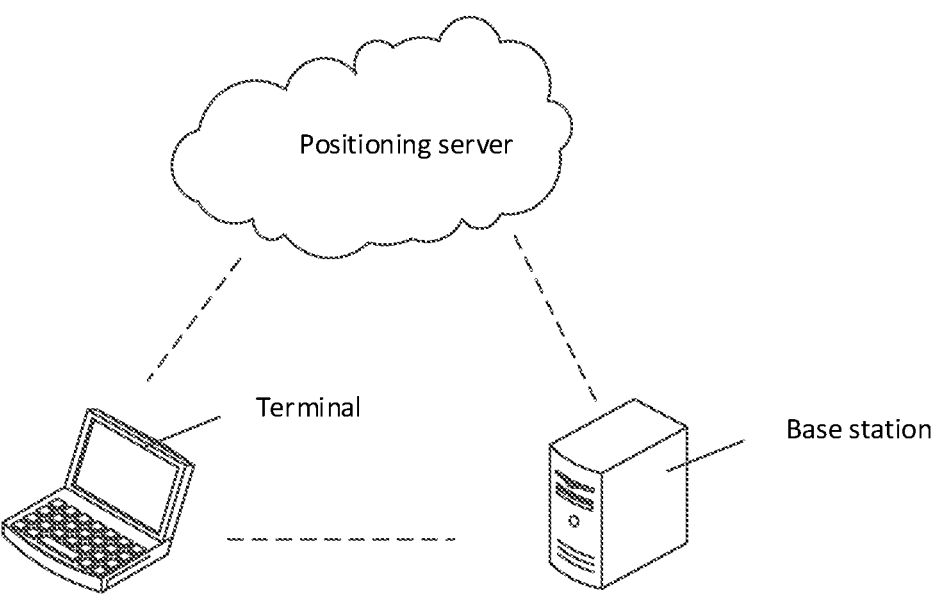
FIG. 1 is an architecture schematic diagram of an uplink positioning system in an embodiment of the disclosure.

The embodiments of the disclosure will be described clearly and completely with reference to the accompanying drawings.

It should be noted that the terms such as "first", "second" and the like in the specification and claims of the disclosure and the above drawings are used to distinguish similar objects, but not necessarily to describe a particular order or sequence. It should be understood that the data used in this way is interchangeable under appropriate circumstances, and the embodiments of the disclosure described herein can be implemented in an order other than those illustrated or described herein. The implementation modes described in the following exemplary embodiments do not represent all the implementation modes consistent with the disclosure. On the contrary, they are only the examples of the devices and methods which are detailed in the attached claims and consistent with some aspects of the disclosure.

When a terminal does not access the network, the terminal can only establish a connection with the network by initiating a random access process (four-step random access process or two-step random access process), and can realize uplink synchronization during this process.

For the four-step random access process, the terminal sends a random access preamble to the base station in the four-step random access process message 1 (Msg1) of the four-step random access process, and the base station determines a Timing Advance (TA) value by measuring the received random access preamble and informs the terminal of the adjustment value of its TA value timing through the four-step random access process message 2 (Msg2) in the four-step random access process, so as to realize the uplink synchronization between the terminal and the network. When the terminal in the IDLE state or INACTIVE state wants to access the network, the terminal will also carry a Radio Resource Control (RRC) establishment request or RRC recovery request message to the network side in the four-step random access procedure message 3 (Msg3). When the terminal receives an RRC establishment or RRC recovery message carried in the four-step random access procedure message 4 (Msg4) sent by the network side, the terminal will return an RRC establishment complete or RRC recovery complete message to the network side, and enter the connection state, that is, establish a connection with the network.

For the two-step random access process, the terminal sends a random access preamble to the base station in MsgA of the two-step random access process, and the base station determines a TA value by measuring the received random access preamble and informs the terminal of the adjustment value of its TA value timing through the two-step random access process message B (MsgB) in the two-step random access process, so as to realize the uplink synchronization between the terminal and the network. In one embodiment, when the terminal in the IDLE state or INACTIVE state wants to access the network, the terminal will also carry an RRC establishment request or RRC recovery request message to the network side in the two-step random access procedure message A (MsgA). When the terminal receives an RRC establishment or RRC recovery message carried in the MsgB sent by the network side, the terminal will return an RRC establishment complete or RRC recovery complete message to the network side, and enter the connection state, that is, establish a connection with the network.

After the terminal accesses the network, the base station can determine the TA value of the terminal on the basis of measuring the uplink transmission of the terminal. Also, when a terminal needs to calibrate its uplink synchronization, the base station will send a TAC to the terminal, to request the terminal to adjust the uplink transmission moment.

A key in the uplink positioning mechanism is to maintain uplink synchronization to ensure the transmission of the uplink SRS. If uplink synchronization cannot be maintained, the SRS transmitted by the terminal cannot be correctly received and measured by the serving base station and other TRP, to result in the decreased positioning accuracy or even positioning failure. The RAT-related uplink and uplink and downlink positioning methods are introduced in R16, including Uplink Time Difference of Arrival (UL-TDOA), Uplink Angle of Arrival (UL-AOA) and Multi-cell Round-Trip Time positioning (Multi-RTT). Referring to FIG. 1, the system architecture corresponding to the two positioning methods described above includes at least a terminal, a base station, and a positioning server. During the positioning process, firstly the base station (for example, the serving base station and multiple TRPs) may receive and measure the SRS transmitted by the terminal based on the assistance data information obtained from the LMF, including measurements of A-AoA, Z-AoA, RTOA and RSRP. Afterwards, the base station will transmit the measurement result to the LMF, and the LMF will calculate the final position based on the SRS measurement result and other configuration information.

The embodiments of the disclosure will be further described in detail below with reference to the accompanying drawings.

In the embodiments of the disclosure, the synchronization state processing method are mainly implemented at the terminal side or the base station side, which will be introduced respectively below.

Terminal side implementation: when a terminal in the IDLE state or INACTIVE state transmits an SRS to the base station, the terminal detects the synchronization state with the base station. The detection of the terminal is based on the first channel state information. i.e., the transmission situation of the downlink reference signal sent by the base station in the channel.

Base station side implementation: when a terminal in the IDLE state or INACTIVE state transmits an SRS to the base station, the base station detects the synchronization state with the terminal. The detection of the base station is based on the second channel state information, i.e., the transmission situation of the SRS transmitted by the terminal in the channel.

Figure 2:
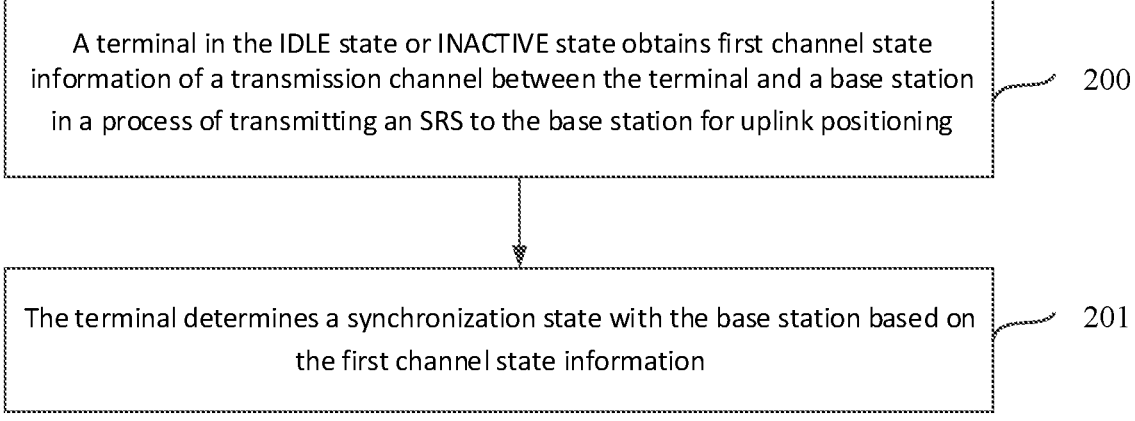
FIG. 2 is a schematic flowchart in which a terminal performs synchronization detection in an embodiment of the disclosure.

The terminal side implementation, that is, the case where the terminal detects the synchronization state with the base station, will be firstly introduced below. Referring to FIG. 2, in embodiments of the disclosure, the process for the terminal to detect the synchronization state is as follows.

Step 200: A terminal in the IDLE state or INACTIVE state obtains the first channel state information of a transmission channel between the terminal and a base station in a process of transmitting an SRS to the base station for uplink positioning.

In the uplink positioning process, in order to reduce the device power consumption, increase the maximum number of positioning services that can be accessed in the network, and further improve the network efficiency, the IDLE-state or INACTIVE-state positioning is introduced in R17. The terminal in the IDLE state or INACTIVE state is not connected to the base station. In this case, how to maintain the uplink synchronization between the terminal and the base station to ensure the transmission of the SRS is a key issue for the IDLE-state or INACTIVE-state positioning.

Here, it needs to be supplemented that the path (that is, transmission channel) between the terminal and the base station is definite.

Furthermore, when considering the impact of the transmission channel on the transmission of the SRS, it is necessary to firstly obtain the first channel state threshold corresponding to the transmission channel, that is, obtain the comparison standard. In an implementation process, before the terminal obtains the first channel state information of the transmission channel between the terminal and the base station, the process further includes: obtaining by the terminal the first channel state threshold corresponding to the transmission channel. The first channel state threshold includes at least one of a first path loss threshold, a first RSRP threshold or a first RSRP variation threshold.

It needs to be further explained here that the ways to obtain the first channel state threshold include the following ways.

In a first way, the terminal obtains the pre-configured first channel state threshold from the RRC information sent by the base station before transitioning from the connected state to the IDLE state or INACTIVE state. In this way, the first channel state threshold is included in the obtained RRC information and delivered by the base station. Correspondingly, after obtaining the RRC information, the terminal obtains the first channel state threshold from the RRC information.

The RRC information obtained by the terminal may be a piece of first channel threshold configuration information including only the first channel state threshold, or SRS configuration information including the first channel state threshold and SRS configuration.

The base station may pre-configure this threshold based on its own signal coverage condition and UE context information stored in the base station.

In a second way, the terminal pre-configures the first channel state threshold.

In this way, the terminal pre-configures the first channel state threshold based on its own algorithm.

In practical applications, transmission channels are divided into two types: time division multiplexing and frequency division multiplexing.

In the embodiments of the disclosure, in order to reduce the impact on the transmitted SRS, the above-mentioned transmission channel can be understood as a time-division multiplexed transmission channel. That is, the terminal transmits the SRS to the base station through the transmission channel in a period of time; and the base station sends the downlink reference signal to the terminal through the transmission channel in another period of time. That is, the impact of the transmission channel on the transmitted SRS can be obtained through the transmission of the downlink reference signal.

During implementations, the impact of the transmission channel on the transmitted SRS is uniformly represented by the first channel state information, and the terminal obtains the first channel state information of the transmission channel. On this basis, the terminal continues to determine the synchronization state with the base station.

Step 201: The terminal determines the synchronization state with the base station based on the first channel state information.

Step 201 may be performed in any one of the following ways.

Way 11) The terminal obtains a first path loss value of the transmission channel, and determines that the uplink out-of-synchronization with the base station occurs if the first path loss value is greater than a set first path loss threshold.

First of all, it needs to be explained here that the terminal obtains the first path loss threshold before the terminal obtains the first path loss value of the transmission channel. The first path loss threshold is a critical value for the terminal to determine whether the uplink out-of-synchronization with the base station occurs.

There are two cases of obtaining the first path loss threshold.

Case 1: the terminal obtains the first path loss threshold pre-configured by the base station.

In this case, the base station firstly configures the first path loss threshold for the terminal based on the signal coverage of the base station itself and the context information of the terminal.

After configuring the first path loss threshold, the base station sends the first path loss threshold to the terminal. The implementations are as follows.

In one embodiment, the base station sends the configuration information of the first channel state threshold to the terminal. The configuration information includes the first path loss threshold pre-configured by the base station for the terminal.

In one embodiment, the base station sends the SRS configuration information to the terminal. The SRS configuration information includes the first path loss threshold pre-configured by the base station for the terminal and the SRS configuration.

Case 2: the terminal pre-configures the first path loss threshold.

In this case, the terminal may pre-configure the first path loss threshold based on its own algorithm.

During implementations, the terminal can obtain the set first path loss threshold in the first case or the second case, and use the first path loss threshold as a comparison standard to further determine whether the uplink out-of-synchronization with the base station occurs.

Secondly, the terminal obtains the first path loss value of the transmission channel.

The process includes the following steps.

Step a: the terminal determines the first sending power of the downlink reference signal sent by the base station on the transmission channel.

Here, the downlink reference signal may be any one of Synchronization Signal and PBCH block (SSB), downlink Positioning Reference Signal (PRS), and the like. The base station sends the downlink reference signal to the terminal, and the downlink reference signal reaches the terminal through the transmission channel, and the terminal can obtain the channel state information of the transmission channel.

Here, the first channel state information is obtained by measuring the power attenuation of the downlink reference signal on the transmission channel. Therefore, in this step, the terminal firstly obtains the first sending power of the downlink reference signal when it is sent out by the base station, that is, the initial power of the downlink reference signal. It should be noted that the above-mentioned first sending power is obtained by the terminal from the base station without measurement.

Step b: the terminal determines the first receiving power of the downlink reference signal received on the transmission channel.

After the downlink reference signal reaches the terminal through the transmission channel, the terminal receives the downlink reference signal and measures the first receiving power of the received downlink reference signal.

Step c: the terminal determines the first path loss value of the transmission channel based on the first sending power and the first receiving power.

Considering the attenuation effect of the transmission channel on the signal, the first receiving power may be different from the first sending power. On this basis, the terminal may determine the first path loss value of the transmission channel according to the first sending power and the first receiving power. For example, the terminal may perform the subtraction or division operation on the first receiving power and the first sending power.

Finally, the terminal compares the first path loss value with the set first path loss threshold after obtaining the first path loss value, that is, determines that the uplink out-of-synchronization with the base station occurs when the first path loss value is greater than the set first path loss threshold; and determines that the uplink synchronization with the base station occurs when the first path loss value is less than or equal to the set first path loss threshold.

Way 12) The terminal obtains the RSRP of the downlink reference signal sent by the base station on the transmission channel, and determines that the uplink out-of-synchronization with the base station occurs if the first RSRP does not exceed a set first RSRP threshold.

Firstly, the terminal obtains the first RSRP threshold, which is a critical value for the terminal to determine whether uplink out-of-synchronization with the base station occurs.

There are two cases of obtaining the first RSRP threshold.

Case 1: the terminal obtains the first RSRP threshold pre-configured by the base station.

In this case, the base station configures the first RSRP threshold for the terminal based on the signal coverage of the base station itself and the context information of the terminal.

After configuring the first RSRP threshold, the base station sends the first RSRP threshold to the terminal. The implementations are as follows.

In one embodiment, the base station sends the configuration information of the first channel state threshold to the terminal. The configuration information includes the first RSRP threshold pre-configured by the base station for the terminal.

In one embodiment, the base station sends the SRS configuration information to the terminal. The SRS configuration information includes the first RSRP threshold pre-configured by the base station for the terminal and the SRS configuration.

Case 2: the terminal pre-configures the first RSRP threshold.

In this case, the terminal may pre-configure the first RSRP threshold based on its own algorithm.

During implementations, the terminal can obtain the set first RSRP threshold in the case 1 or the case 2, and use the first RSRP threshold as a comparison standard to further determine whether the uplink out-of-synchronization with the base station occurs.

Secondly, the terminal obtains the RSRP of the downlink reference signal sent by the base station on the transmission channel.

For example, the terminal measures the reference signal receiving power of a signal such as SSB or PRS sent by the base station.

Finally, the terminal compares the first RSRP with the set first RSRP threshold after obtaining the first RSRP, that is, determines that the uplink out-of-synchronization with the base station occurs when the first RSRP does not exceed the set first RSRP threshold; and determines that the uplink synchronization with the base station occurs when the first RSRP is less than the set first RSRP threshold.

Way 13) The terminal obtains a first RSRP variation of the downlink reference signal sent by the base station on the transmission channel, and determines that the uplink out-of-synchronization with the base station occurs if the first RSRP variation is greater than a set first RSRP variation threshold.

Firstly, the terminal obtains the first RSRP variation threshold, which is a critical value for the terminal to determine whether uplink out-of-synchronization with the base station occurs. There are two cases of obtaining the first RSRP variation threshold.

Case 1: the terminal obtains the first RSRP variation threshold pre-configured by the base station.

In this case, the base station configures the first RSRP variation threshold for the terminal based on the signal coverage of the base station itself and the context information of the terminal.

After configuring the first RSRP variation threshold, the base station sends the first RSRP variation threshold to the terminal. The implementations are as follows.

In one embodiment, the base station sends the configuration information of the first channel state threshold to the terminal. The configuration information includes the first RSRP variation threshold pre-configured by the base station for the terminal.

In one embodiment, the base station sends the SRS configuration information to the terminal. The SRS configuration information includes the first RSRP variation threshold pre-configured by the base station for the terminal and the SRS configuration.

Case 2: the terminal pre-configures the first RSRP variation threshold.

In this case, the terminal may pre-configure the first RSRP variation threshold based on its own algorithm.

During implementations, the terminal can obtain the set first RSRP variation threshold in the case 1 or the case 2, and use the first RSRP variation threshold as a comparison standard to further determine whether the uplink out-of-synchronization with the base station occurs.

Secondly, the terminal obtains the first RSRP variation of the RSRP of the downlink reference signal sent by the base station on the transmission channel. This process includes the following steps.

Step a: the terminal determines the second RSRP of the downlink reference signal sent by the base station on the transmission channel at a first moment. The first moment is a moment to start transmitting the SRS to the base station.

Here, the downlink reference signal may be any one of SSB, PRS and the like. The base station sends the downlink reference signal to the terminal, and the downlink reference signal reaches the terminal through the transmission channel, and the terminal obtains the first channel state information of the transmission channel.

Here, the first channel state information is obtained by measuring the amount of change in the reference signal receiving power of the downlink reference signal on the transmission channel. Therefore, in this step, the terminal firstly obtains the second RSRP of the downlink reference signal sent by the base station on the transmission channel at the first moment, i.e., the reference signal receiving power of the downlink reference signal. It is emphasized here that the first moment is the moment to start transmitting the SRS to the base station. Usually, when transmitting the SRS to the base station for the first time, the terminal obtains the second RSRP of the downlink reference signal at the same time.

Step b: the terminal determines the third RSRP of the downlink reference signal sent by the base station on the transmission channel at a second moment. The second moment is any moment after the first moment.

When the downlink reference signal is transmitted on the transmission channel, the terminal obtains the third RSRP of the downlink reference signal sent by the base station on the transmission channel at the second moment. In order to distinguish from the reference signal receiving power in Step a, it is emphasized here that the second moment is any moment after the first moment, that is, the third RSRP of the downlink reference signal is obtained again after the downlink reference signal has been transmitted on the transmission channel for a period of time (that is, the time corresponding to the difference between the second moment and the first moment).

Step c: the terminal determines the corresponding first RSRP variation based on the second RSRP and the third RSRP.

Considering the attenuation effect of the transmission channel on the signal, the third RSRP may be different from the second RSRP. On this basis, the terminal may determine the first RSRP variation of the transmission channel according to the second RSRP and the third RSRP, for example, perform the subtraction operation on the third RSRP and the second RSRP.

Finally, the terminal compares the first RSRP variation with the set first RSRP variation threshold after obtaining the first RSRP variation, that is, determines that the uplink out-of-synchronization with the base station occurs when the first RSRP variation is greater than the set first RSRP variation threshold; and determines that the uplink synchronization with the base station occurs when the first RSRP variation is less than or equal to the set first RSRP variation threshold.

The terminal continues to process the uplink out-of-synchronization after determining that the uplink out-of-synchronization with the base station occurs in the above way 11), 12) or 13).

If the terminal determines that uplink out-of-synchronization with the base station occurs, the terminal re-estab-lishes synchronization with the base station and continues to transmit the SRS, or determines that positioning fails and generates a first positioning failure indication, or gives up transmitting the SRS and waits for performing the processing result of the base station.

In implementations, the above processing process may be implemented through but not limited to the following approach 1, 2 or 3.

Approach 1: The terminal re-establishes synchronization with the base station and continues to transmit the SRS.

Way a) The terminal initiates a random access process to the base station and obtains an updated TA value, to re-establish synchronization with the base station and continue to transmit the SRS after establishing synchronization. The terminal does not enter the connected state in the random access process.

During implementations, when the terminal determines uplink out-of-synchronization with the base station, the terminal stops transmitting the SRS and actively initiates a random access process (four-step random access process or two-step random access process) to the base station to synchronize with the base station. It should be noted that the random access process here does not make the terminal enter the connected state. The terminal can obtain the updated TA value through Msg2 or MsgB in the random access process, and re-establish synchronization with the base station based on the TA value. After the synchronization between the terminal and the base station is completed again, the terminal continues to transmit the SRS, and performs the subsequent positioning process in the IDLE state or the INAC-TIVE state.

It should be further explained that, for the four-step random access process, in order to ensure that the terminal does not establish a connection with the base station, any of two following cases of operations is included.

Case 1: After obtaining the updated TA value in Msg2, the terminal may give up the subsequent four-step random access process, that is, give up transmitting Msg3.

Case 2: The terminal does not carry the RRC establishment request or RRC recovery request message in the subsequent Msg3.

It should be further explained that, for the two-step random access process, in order to ensure that the terminal does not establish a connection with the base station, the terminal does not carry the RRC establishment request or RRC recovery request message in MsgA.

Way b) The terminal continues to transmit the SRS after establishing a connection with the base station.

When the terminal determines uplink out-of-synchronization with the base station, the terminal stops sending the SRS and actively initiates an RRC establishment process or RRC recovery process to the base station to re-synchronize with the base station. After the terminal receives an RRC establishment indication or RRC recovery indication from the base station, the terminal enters the connected state and continues to transmit the SRS, to complete the subsequent positioning process.

The terminal re-establishes synchronization with the base station and then continues to transmit the SRS to complete the subsequent positioning process in Way a) or b).

Approach 2: The terminal determines that the positioning fails and generates a first positioning failure indication.

It should be noted that, after the terminal determines that the positioning fails, the terminal will also perform at least one of the following operations: the terminal stops transmitting the SRS; and the terminal discards the SRS configuration information.

The terminal stops transmitting the SRS, that is, the terminal does not continue to transmit the current SRS after determining uplink out-of-synchronization with the base station, and the base station cannot receive the SRS.

The terminal discards the SRS configuration information, that is, the terminal discards the SRS configuration information after determining uplink out-of-synchronization with the base station.

In addition, the terminal generates the first positioning failure indication. For example, after the terminal determines uplink out-of-synchronization with the base station, the terminal generates the first positioning failure indication, and gives up the current positioning process in the IDLE state or the INACTIVE state.

For example, after the terminal determines that the positioning fails and generates the first positioning failure indication, the terminal may send the first positioning failure indication to the positioning server to end the positioning process in any of the following ways.

In a first way, the terminal sends the first positioning failure indication to the base station, and then the base station sends the first positioning failure indication to the positioning server to notify the positioning server of the positioning failure, to end the positioning process.

During implementations, the terminal sends the first positioning failure indication to the base station to notify the base station of the current positioning failure, which can be implemented in the following (1) or (2).

(1) The terminal initiates a random access process to the base station, and sends the first positioning failure indication carried in Msg3 or MsgA in the random access process to the base station. The terminal does not enter the connected state in the random access process.

During implementations, the terminal initiates a random access process to the base station, and carries the first positioning failure indication in Msg3 or MsgA in the random access process, to notify the base station of the current positioning failure. The terminal does not enter the connected state in the random access process.

It should be further explained that, for the four-step random access process, in order to ensure that the terminal does not establish a connection with the base station, the terminal does not carry the RRC establishment request or RRC recovery request message in the subsequent Msg3.

It should be further explained that, for the two-step random access process, in order to ensure that the terminal does not establish a connection with the base station, the terminal does not carry the RRC establishment request or RRC recovery request message in MsgA.

(2) The terminal sends the first positioning failure indication to the base station through an RRC message or MAC CE after establishing a connection with the base station.

For example, the terminal initiates an RRC establishment process or an RRC recovery process to the base station, and sends the first positioning failure indication to the base station through an RRC message or MAC CE after establishing a connection with the base station.

During implementations, the terminal actively initiates the RRC establishment process or RRC recovery process to the base station. When the terminal receives the RRC establishment indication or RRC recovery indication from the base station, the terminal enters the connected state. That is, after establishing a connection with the base station, the terminal sends the first positioning failure indication to the base station through the RRC message or MAC CE. That is, the RRC message may be an RRC message carrying the first positioning failure indication, and the MAC CE message may be an MAC CE message carrying the first positioning failure indication.

In a second way, the terminal sends the first positioning failure indication to the positioning server directly.

For example, the terminal directly notifies the positioning server of the current positioning failure through an LPP message. Te LPP message carries the first positioning failure indication.

Approach 3: The terminal gives up transmitting the SRS and waits for performing the processing result of the base station.

When the terminal finds uplink out-of-synchronization with the base station, the terminal directly gives up transmitting the SRS. Then the terminal does not perform any operation, and waits until the base station detects uplink out-of-synchronization and performs corresponding processing.

Figure 3:
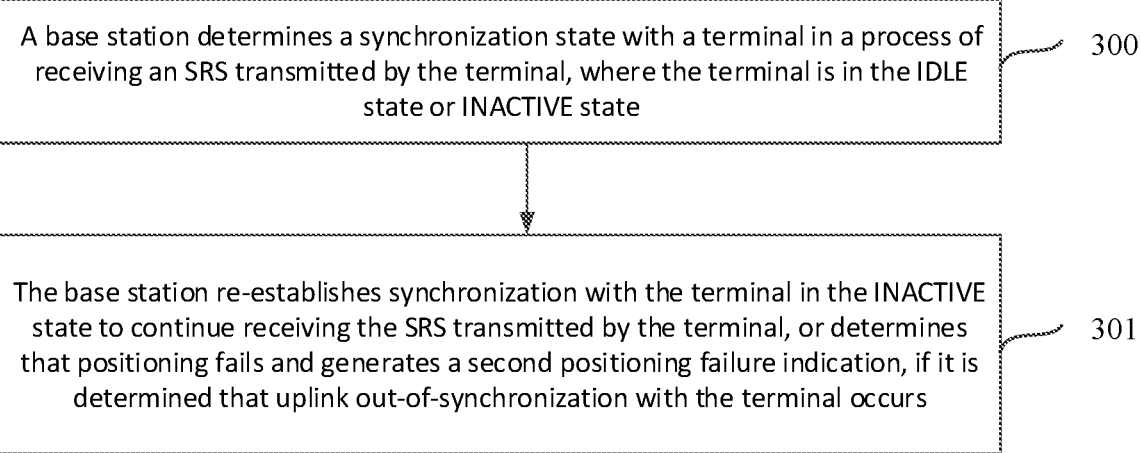
FIG. 3 is a schematic flowchart in which a base station performs synchronization detection in an embodiment of the disclosure.

The base station side implementation, that is, the case where the base station detects the synchronization state with the terminal, will be introduced below. Referring to FIG. 3, in embodiments of the disclosure, the process for the base station to detect the synchronization state is as follows.

Step 300: The base station determines the synchronization state with a terminal in a process of receiving an SRS transmitted by the terminal. The terminal is in the IDLE state or INACTIVE state.

In the uplink positioning process, when the terminal transmits the SRS to the base station, the base station is in the state of receiving the SRS transmitted by the terminal, and the path (that is, transmission channel) between the terminal and the base station is definite.

Furthermore, when considering the impact of the transmission channel on the transmission of the SRS, it is necessary to firstly obtain the second channel state threshold corresponding to the transmission channel, that is, obtain the comparison standard. For example, in the implementation process, before the base station obtains the second channel state information of the transmission channel between the base station and the terminal, the process further includes: the base station obtains the second channel state threshold corresponding to the transmission channel. The second channel state threshold includes at least one of a second path loss threshold, a second RSRP threshold or a second RSRP variation threshold.

It should be further explained here that the above-mentioned second channel state threshold is pre-configured by the base station. In this way, the base station may pre-configure the second channel state threshold based on its own algorithm.

In practical applications, the impact of the transmission channel on the transmitted SRS is uniformly represented by the second channel state information. For example, the base station obtains the second channel state information according to the received SRS.

For example, the base station determines the synchronization state with the terminal based on the second channel state information, and the steps can be implemented in one of the following ways.

Way 21) The base station determines that uplink out-of-synchronization with the terminal occurs when receiving no SRS within the preconfigured maximum receiving time window.

In an implementation process, the base station counts whether the SRS is received within the maximum receiving time window. The maximum receiving time window is pre-configured by the base station and described in two following cases.

For example: when the maximum receiving time window is the maximum duration required to receive an SRS, the base station considers that uplink out-of-synchronization has occurred if the base station receives no SRS from receiving the SRS last time to exceeding the maximum receiving time window, that is, the number of SRSs received until the end moment of the maximum receiving time window is zero.

For another example: when the maximum receiving time window is the maximum duration required to receive multiple SRSs, the base station considers that uplink out-of-synchronization has occurred if a quantity of N SRSs are not received within the maximum receiving time window, i.e., within the receiving time during which N consecutive SRSs should be received.

Way 22) The base station obtains a second path loss value of the transmission channel, and determines that uplink out-of-synchronization with the terminal occurs if the second path loss value is greater than a set second path loss threshold. The second path loss threshold is pre-configured by the base station.

Firstly, it should be noted that the above-mentioned second path loss threshold is a critical value for the base station to determine whether the uplink out-of-synchronization with the terminal occurs.

Secondly, the base station obtains the second path loss value of the transmission channel in the following steps.

Step a): The base station determines the second receiving power of the received SRS.

After the SRS arrives at the base station through the transmission channel, the base station receives the SRS and measures the second receiving power of the received SRS.

Step b): The base station determines the second sending power of the SRS transmitted by the terminal.

The second channel state information is obtained by measuring the power attenuation of the SRS on the transmission channel. Therefore, in this step, the terminal firstly obtains the second sending power of the SRS when the terminal transmits it out. It should be noted that the initial power of the SRS is pre-configured by the base station, that is, the second sending power is known by the base station.

Step c): The base station determines the second path loss value based on the receiving power and the sending power.

Considering the attenuation effect of the transmission channel on the signal, the second receiving power may be different from the second sending power. On this basis, the base station may determine the second path loss value of the transmission channel according to the second sending power and the second receiving power, for example, perform the subtraction or division operation on the second receiving power and the second sending power.

Finally, the base station compares the second path loss value with the set second path loss threshold after obtaining the second path loss value, that is, determines that the uplink out-of-synchronization with the terminal occurs when the second path loss value is greater than the set second path loss threshold; and determines that the uplink synchronization with the terminal occurs when the second path loss value is less than or equal to the set second path loss threshold.

Way 23) The base station obtains the fourth RSRP of the SRS transmitted by the terminal on the transmission channel, and determines that the uplink out-of-synchronization with the terminal occurs if the fourth RSRP does not reach a set second RSRP threshold. The second RSRP threshold is pre-configured by the base station.

It should be noted that the above-mentioned second RSRP threshold is a critical value for the base station to determine whether the uplink out-of-synchronization with the terminal occurs.

In an implementation process, the base station obtains the fourth RSRP of the SRS transmitted by the terminal on the transmission channel.

Finally, the base station uses the second RSRP threshold as a comparison standard to further determine whether the uplink out-of-synchronization with the terminal occurs. That is, if the fourth RSRP is less than or equal to the set second RSRP threshold, it is determined that the uplink out-of-synchronization with the terminal occurs; if the fourth RSRP is greater than the set second RSRP threshold, it is determined that the uplink synchronization with the terminal occurs.

Way 24) The base station obtains a second RSRP variation of the RSRP of the SRS transmitted by the terminal on the transmission channel, and determines that the uplink out-of-synchronization with the terminal occurs if the second RSRP variation is greater than a set second RSRP variation threshold. The second RSRP variation threshold is pre-configured by the base station.

It should be noted that the above-mentioned second RSRP variation threshold is a critical value for the base station to determine whether the uplink out-of-synchronization with the terminal occurs.

In an implementation process, the base station uses the second RSRP variation threshold as a comparison standard to further determine whether the uplink out-of-synchronization with the terminal occurs. That is, if the second RSRP variation is greater than the set second RSRP variation threshold, it is determined that the uplink out-of-synchronization with the terminal occurs; if the second RSRP variation is less than or equal to the set second RSRP variation threshold, it is determined that the uplink synchronization with the terminal occurs.

Here, the base station obtains the second RSRP variation of the RSRP of the SRS transmitted by the terminal on the transmission channel in the following steps.

Step 1): The base station determines the fifth RSRP of the SRS transmitted by the terminal on the transmission channel at a third moment. The third moment is a moment when the base station receives the SRS for the first time.

The second channel state information is obtained by measuring the amount of change in the reference signal receiving power of the SRS on the transmission channel. Therefore, in this step, the base station firstly obtains the fifth RSRP of the SRS transmitted by the terminal on the transmission channel at the third moment, i.e., the reference signal receiving power of the SRS. It is emphasized here that the third moment is the moment when the base station receives the SRS for the first time, that is, the fifth RSRP of the SRS is obtained at the beginning moment of the uplink positioning process.

Step 2): The base station determines the sixth RSRP of the SRS transmitted by the terminal on the transmission channel at a fourth moment. The fourth moment is any moment after the third moment.

When the SRS is transmitted on the transmission channel, the base station obtains the sixth RSRP of the SRS transmitted by the terminal on the transmission channel at the fourth moment. In order to distinguish from the reference signal receiving power in step 1), it is emphasized here that the fourth moment is any moment after the third moment, that is, the sixth RSRP of the SRS is obtained again after the SRS has been transmitted on the transmission channel for a period of time (that is, the time corresponding to the difference between the fourth moment and the third moment).

Step 3): The base station determines the corresponding second RSRP variation based on the fifth RSRP and the sixth RSRP.

Considering the attenuation effect of the transmission channel on the signal, the sixth RSRP may be different from the fifth RSRP. On this basis, the base station may determine the second RSRP variation of the transmission channel according to the fifth RSRP and the sixth RSRP, for example, perform the subtraction operation on the sixth RSRP and the fifth RSRP.

Finally, the base station compares the second RSRP variation with the set second RSRP variation threshold after obtaining the second RSRP variation, that is, determines that the uplink out-of-synchronization with the terminal occurs when the second RSRP variation is greater than the set second RSRP variation threshold; and determines that the uplink synchronization with the terminal occurs when the second RSRP variation is less than or equal to the set second RSRP variation threshold.

The base station continues to process the uplink out-of-synchronization after determining that the uplink out-of-synchronization with the terminal occurs in the above Way 21), 22), 23) or 24).

Step 301: The base station re-establishes synchronization with the terminal in the INACTIVE state to continue receiving the SRS transmitted by the terminal, or determines that positioning fails and generates a second positioning failure indication, if it is determined that uplink out-of-synchronization with the terminal occurs.

Step 301 may be performed in any one of the following ways.

In a first way, the above-mentioned step in which the base station re-establishes synchronization with the terminal in the INACTIVE state to continue receiving the SRS transmitted by the terminal can be realized through but not limited to the following approach (1), (2), (3) or (4) during implementations.

Approach (1): The base station continues receiving the SRS transmitted by the terminal after establishing connection with the terminal.

During implementations, the base station can send a paging message to the terminal in the INACTIVE state, and the terminal initiates an RRC establishment process or RRC recovery process and re-synchronizes with the base station after receiving the paging message. After the terminal receives the RRC establishment or RRC recovery indication from the base station, the terminal enters the connected state after the base station establishes a connection with the terminal, and the base station continues receiving the SRS transmitted by the terminal.

Approach (2): The base station sends a first paging message to the terminal. The first paging message carries a TA value updated by the base station, and the terminal re-establishes synchronization with the base station based on the received TA value, and the terminal does not initiate a random access process and continues to transmit the SRS in the INACTIVE state after receiving the first paging message.

During implementations, the base station can send the first paging message to the terminal in the INACTIVE state. The first paging message carries the TA value updated by the base station for the terminal. The terminal completes uplink synchronization with the base station again after receiving the updated TA value carried in the first paging message.

Then, after receiving the first paging message, the terminal does not initiate a random access process, continues to transmit the SRS in the INACTIVE state, and continues the subsequent positioning process. That is, the base station continues to receive the SRS transmitted by the terminal.

Approach (3): The base station sends a second paging message to the terminal and the terminal initiates a random access process and obtains an updated TA value to re-establish synchronization with the base station. The base station issues an RRC release indication in Msg4 or MsgB and the terminal continues to transmit the SRS in the INACTIVE state.

During implementations, the base station can send the second paging message to the terminal in the INACTIVE state. The terminal initiates a random access process to re-synchronize (but does not establish a connection) after receiving the second paging message. The base station side can carry the updated TA value to the terminal in Msg2 or MsgB during the random access process. The terminal re-synchronizes with the base station after receiving the updated TA value. Also, the base station issues an RRC release indication in Msg4 or MsgB, and the terminal remains in the INACTIVE state and continues this positioning.

Approach (4): The base station sends a third paging message to the terminal. The third paging message carries an instruction to perform IDLE or INACTIVE uplink positioning, and the terminal initiates a random access process and obtains an updated TA value to re-establish synchronization with the base station, and the terminal continues to transmit the SRS in the INACTIVE state.

During implementations, the base station may send the third paging message to the terminal in the INACTIVE state. The third paging message carries an instruction to perform IDLE or INACTIVE uplink positioning. Thus, the terminal can initiate the four-step random access process or two-step random access process, and obtain the updated TA value in Msg2 or two-step random access process B (MsgB) to re-establish synchronization with the base station, and the terminal continues to transmit the SRS in the INACTIVE state.

It should be further explained that, for the four-step random access process, in order to ensure that the terminal remains in the INACTIVE state, any of two following cases of operations is included.

Case 1: After obtaining the updated TA value in Msg2, the terminal may give up the subsequent four-step random access process, that is, give up transmitting Msg3.

Case 2: The terminal does not carry the RRC establishment request or RRC recovery request message in the subsequent Msg3.

It should be further explained that, for the two-step random access process, in order to ensure that the terminal remains in the INACTIVE state, the terminal does not carry the RRC establishment request or RRC recovery request message in MsgA.

In a second way, the base station may further send the generated second positioning failure indication to the positioning server and/or the terminal in the INACTIVE state after determining that the positioning fails and generating the second positioning failure indication during implementations.

Three following processing methods are included.

Method 1) The base station sends the generated second positioning failure indication to the positioning server.

For example, after the base station determines uplink out-of-synchronization with the terminal, the base station determines that the current positioning fails, generates the second positioning failure indication, and sends the second positioning failure indication to the positioning server through an NRPPa message.

Here, the base station sends the generated second positioning failure indication to the positioning server. That is, the base station determines that the current positioning fails, and notifies the positioning server of the current positioning failure through the NRPPa message. The NRPPa message carries the second positioning failure indication.

Method 2) The base station sends the generated second positioning failure indication to the positioning server, and sends the second positioning failure indication to the terminal in the INACTIVE state, and the terminal stops transmitting the SRS.

For example, after the base station determines uplink out-of-synchronization with the terminal, the base station determines that the current positioning fails, generates the second positioning failure indication, and sends the second positioning failure indication to the positioning server through an NRPPa message.

Here, the base station sends the generated second positioning failure indication to the positioning server, that is, the base station determines that the current positioning fails, and notifies the positioning server of the current positioning failure through the NRPPa message. The NRPPa message carries the second positioning failure indication.

Further, the base station also sends the second positioning failure indication to the terminal in the INACTIVE state in two implementations as follows.

2-1) The base station sends the second positioning failure indication to the terminal to notify the terminal of positioning failure after establishing a connection with the terminal.

During implementations, the base station sends a paging message to the terminal. Terminal initiates an RRC establishment process or an RRC recovery process after receiving the paging message. The terminal enters the connected state after receiving an RRC establishment or recovery indication from the base station side. That is, the base station establishes a connection with the terminal. Afterwards, the base station sends the second positioning failure indication to the terminal. After receiving the second positioning failure indication, the terminal considers that positioning fails, and stops transmitting the SRS and/or discards the SRS configuration information configured in the last positioning.

It should be explained here that, in case 1), the base station sends the second positioning failure indication to the terminal after establishing connection with the terminal. The way for the base station to send the second positioning failure indication includes any one of: the base station carries the second positioning failure indication in any one of MAC CE, Downlink Control Information (DCI) and RRC message. For example, the base station carries the second positioning failure indication in the MAC CE, or carries the second positioning failure indication in the DCI, or carries the second positioning failure indication in the RRC message.

2-2) The base station sends a fourth paging message carrying the second positioning failure indication to the terminal to notify the terminal of current positioning failure, and the terminal does not initiate a random access process and continues keeping in the INACTIVE state after receiving the fourth paging message.

During implementations, the base station carries the second positioning failure indication in the fourth paging message to notify the terminal of the current positioning failure, and the terminal does not initiate a random access process and continues keeping in the INACTIVE state after receiving the fourth paging message carrying the second positioning failure indication. After receiving the second positioning failure indication, the terminal considers that positioning fails, and stops transmitting the SRS and/or discards the SRS configuration information configured in the last positioning.

3) The base station sends the generated second positioning failure indication to the positioning server, and then the positioning server sends the second positioning failure indication to the terminal.

For example, after the base station determines uplink out-of-synchronization with the terminal, the base station determines that the current positioning fails, generates the second positioning failure indication, and sends the second positioning failure indication to the positioning server through an NRPPa message.

Here, the base station sends the generated second positioning failure indication to the positioning server. That is, the base station determines that the current positioning fails, and notifies the positioning server of the current positioning failure through the NRPPa message. The NRPPa message carries the second positioning failure indication.

After receiving the positioning failure indication, the positioning server sends the positioning failure indication to the terminal in two ways as follows.

Way 3-1) The positioning server sends the received second positioning failure indication to the core network, instructs the core network to send a fifth paging message to the terminal (UE), and carries the second positioning failure indication in the third paging message.

Way 3-2) The positioning server carries the received second positioning failure indication in its positioning broadcast information.

In embodiments (corresponding to 3-1), after the positioning server obtains the positioning failure information, the positioning server notifies the Access and Mobility Management Function (AMF) to initiate paging on the core network side, and carries the second positioning failure indication in the fifth paging message to the terminal, to notify the terminal that the current positioning fails. After receiving the second positioning failure indication, the terminal considers that positioning fails, and stops transmitting the SRS and/or discards the SRS configuration information configured in the last positioning.

In other embodiments (corresponding to 3-2), after the positioning server obtains the positioning failure information, the positioning server may broadcast the positioning system information (posSIB) and carry the second positioning failure indication in posSIB to the terminal, to notify the terminal that the current positioning fails. After receiving the second positioning failure indication, the terminal considers that positioning fails, and stops transmitting the SRS and/or discards the SRS configuration information configured in the last positioning.

The above content will be illustrated below in details by several application scenarios.

Application Scenario 1: The terminal determines whether uplink out-of-synchronization with the base station occurs based on the first path loss threshold.

Step 1: The terminal obtains the first path loss threshold LP_Threshold. The threshold is a critical value for determining whether uplink out-of-synchronization with the base station occurs. When the first path loss value between the terminal and the base station exceeds this threshold, it is considered that uplink out-of-synchronization has occurred between the terminal and the base station; otherwise, it is considered that uplink synchronization is still maintained between the terminal and the base station. The ways to obtain the first path loss threshold are as follows.

Way (1) In one embodiment, the base station pre-configures the first path loss threshold LP_Threshold and sends it to the terminal.

Steps are as follows.

Step a: The base station pre-configures the first path loss threshold LP_Threshold for the terminal according to its own signal coverage and the context information of the terminal.

Step b: The base station sends the pre-configured first path loss threshold to the terminal.

In one embodiment, the base station makes the first path loss threshold LP_Threshold be contained in the SRS configuration information configured for the terminal, that is, sends the first path loss threshold LP_Threshold to the terminal as a part of the SRS configuration information.

In one embodiment, the base station sends the first path loss threshold LP_Threshold to the terminal directly.

Way (2) In one embodiment, the terminal obtains the first path loss threshold LP_Threshold based on its own algorithm.

Step 2: The receiving power of the terminal for receiving the SSB signal sent by the base station at a moment T1 is denoted as P1. Then the first path loss value LP_1 between the terminal and the base station at the moment T1 may be expressed as P0-P1, where P0 is the sending power of the base station side for sending the SSB signal.

Step 3: The terminal compares the first path loss value LP_1 at the moment T1 with the first path loss threshold LP_Threshold.

For example, if LP_1>LP_Threshold, the uplink out-of-synchronization between the terminal and the base station occurs.

If LP_1<LP_Threshold, the uplink synchronization between the terminal and the base station occurs.

Application Scenario 2: The terminal determines whether uplink out-of-synchronization with the base station occurs based on the first RSRP threshold.

Step 1: The terminal obtains the first RSRP threshold RSRP_Threshold, which is a threshold for determining whether the terminal is out of uplink synchronization. When the first RSRP of the received SSB signal exceeds this threshold, it is considered that uplink out-of-synchronization has occurred between the terminal and the base station; otherwise, it is considered that uplink synchronization is still maintained between the terminal and the base station. The ways to obtain the first RSRP threshold are as follows.

Way (1) In one embodiment, the base station pre-configures the first RSRP threshold RSRP_Threshold and sends it to the terminal.

The execution steps are as follows.

Step a: The base station pre-configures the first RSRP threshold RSRP_Threshold for the terminal according to its own signal coverage and the context of the terminal.

Step b: The base station sends the pre-configured first RSRP threshold to the terminal.

In one embodiment, the base station makes the first RSRP threshold RSRP_Threshold be contained in the SRS configuration information configured for the terminal, that is, sends the first RSRP threshold RSRP_Threshold to the terminal as a part of the SRS configuration information.

In one embodiment, the base station sends the first RSRP threshold RSRP_Threshold to the terminal directly.

Way (2) In one embodiment, the terminal obtains the first RSRP threshold RSRP_Threshold based on its own algorithm.

Step 2: The terminal measures the first RSRP (denoted as RSRP_1) of the SSB signal sent by the base station at a moment T1.

Step 3: The terminal compares the RSRP_1 measured at the moment T1 with the first RSRP threshold RSRP_Threshold.

For example, iff RSRP_1<RSRP_Threshold, the uplink out-of-synchronization between the terminal and the base station occurs.

If RSRP_1>RSRP_Threshold, the uplink synchronization between the terminal and the base station occurs.

Application Scenario 3: The terminal determines whether uplink out-of-synchronization with the base station occurs based on the first RSRP variation threshold.

Step 1: The terminal obtains the first RSRP variation threshold RSRP_Variation. When the first RSRP variation of the RSRP of the received SSB signal at different moments exceeds this threshold, it is considered that uplink out-of-synchronization has occurred between the terminal and the base station; otherwise, it is considered that uplink synchronization is still maintained between the terminal and the base station. The ways to obtain the first RSRP variation threshold are as follows.

Way (1) In one embodiment, the base station configures the first RSRP variation threshold RSRP_Variation and sends it to the terminal.

Steps are as follows.

Step a: The base station pre-configures the first RSRP variation threshold RSRP_Variation for the terminal according to its own signal coverage and the context information of the terminal.

Step b: The base station sends the pre-configured first RSRP variation threshold to the terminal as follows.

In one embodiment, the base station makes the first RSRP variation threshold RSRP_Variation be contained in the SRS configuration information configured for the terminal, that is, sends the first RSRP variation threshold RSRP_Variation to the terminal as a part of the SRS configuration information.

In one embodiment, the base station sends the first RSRP variation threshold RSRP_Variation to the terminal directly.

Way (2) In one embodiment, the terminal obtains the first RSRP variation threshold RSRP_Variation based on its own algorithm.

Step 2: Taking the moment when the terminal starts to send the uplink SRS signal as the reference time point TO, the terminal measures the second RSRP (denoted as RSRP_2) of the SSB signal sent by the serving base station at TO.

Step 3: The terminal measures the third RSRP (denoted as RSRP_3) of the SSB signal sent by the base station at a moment T1. Then the first RSRP variation of the RSRP measured by the terminal within T1-T0 is RSRP_3-RSRP_2.

Step 4: The terminal compares the value of the measured first RSRP variation RSRP_1-RSRP_0 with the first RSRP variation threshold RSRP_Variation.

For example, if RSRP_1-RSRP_0>RSRP_Variation, the uplink out-of-synchronization between the terminal and the base station occurs.

If RSRP_1-RSRP_0≤RSRP_Variation, the uplink synchronization between the terminal and the base station occurs.

Application Scenario 4: The terminal actively determines that uplink out-of-synchronization occurs, initiates a random access process (but does not establish a connection) to re-synchronize, and then continues the IDLE/INACTIVE positioning process.

Steps are as follows.

Step 1: The terminal performs the IDLE or INACTIVE uplink positioning process, where the terminal is in the IDLE/INACTIVE state, and the terminal obtains the SRS configuration information configured by the base station and the first path loss threshold LP_Threshold, and transmits the SRS.

Step 2: When the terminal finds uplink out-of-synchronization, the terminal stops sending the SRS, and actively initiates a random access process to the base station (but does not enter the connected state) to synchronize with the base station.

Step 3: The terminal completes uplink synchronization but remains in the IDLE state or INACTIVE state. The terminal continues to transmit the SRS according to the SRS configuration information, and completes the subsequent IDLE or INACTIVE positioning process.

Application Scenario 5: The terminal actively determines that uplink out-of-synchronization occurs, and enters the connected state to continue positioning. Steps are as follows.

Step 1: The terminal performs the IDLE or INACTIVE uplink positioning process, where the terminal is in the IDLE/INACTIVE state, and the terminal obtains the SRS configuration information configured by the base station and the first path loss threshold LP_Threshold, and transmits the SRS.

Step 2: When the terminal finds uplink out-of-synchronization, the terminal stops sending the SRS, and actively initiates an RRC establishment process or RRC recovery process.

Step 3: When the terminal receives an RRC establishment indication or RRC recovery message sent by the base station, the terminal enters the connected state and completes uplink synchronization with the base station again. Afterwards, the terminal remains in the connected state and continues to perform the SRS uplink transmission to complete the subsequent positioning process.

Application Scenario 6: The terminal actively determines that uplink out-of-synchronization occurs, and abandons this positioning.

Steps are as follows.

Step 1: The terminal performs the IDLE or INACTIVE uplink positioning process, where the terminal is in the IDLE/INACTIVE state, and the terminal obtains the SRS configuration information configured by the base station and the first path loss threshold LP_Threshold, and performs the uplink SRS transmission.

Step 2: When the terminal finds uplink out-of-synchronization, the terminal directly abandons this IDLE/INACTIVE positioning and stops sending the SRS.

Step 3: The terminal notifies the positioning server that the current positioning fails in the following ways.

In one embodiment, the terminal may firstly notify the base station that the current positioning fails, and then the base station notifies the positioning server that the current positioning fails through the NRPPa protocol.

In one embodiment, the terminal actively initiates a random access process, and carries the first positioning failure indication in Msg3 or MsgA in the random access process to notify the base station that the current positioning fails.

In one embodiment, the terminal actively initiates an RRC establishment process or RRC recovery process. After the terminal receives an RRC establishment indication or RRC recovery indication from the base station, the terminal enters the connected state, and then sends a positioning failure notification message to notify the base station that the current positioning fails. The above positioning failure notification message are as follows.

In one embodiment, the terminal notifies the base station that the current positioning fails through the MAC CE carrying the first positioning failure indication.

In one embodiment, the terminal notifies the base station that the current positioning fails through the RRC message carrying the first positioning failure indication.

In one embodiment, the terminal directly notifies the positioning server that the positioning fails through the LPP protocol.

Application Scenario 7: The terminal actively determines that uplink out-of-synchronization occurs, but performs no operation and waits for the base station to process.

Steps are as follows.

Step 1: The terminal performs the IDLE or INACTIVE uplink positioning process, where the terminal is in the IDLE/INACTIVE state, and the terminal obtains the SRS configuration information configured by the base station and the first path loss threshold LP_Threshold, and performs the uplink SRS transmission.

Step 2: When the terminal finds uplink out-of-synchronization, the terminal stops sending the SRS. Subsequently, the terminal side does not perform any operation, waits for the base station to detect whether it is out of uplink synchronization with the terminal, and waits for performing the processing result of the base station.

Application Scenario 8: The base station determines whether uplink out-of-synchronization occurs based on whether the SRS is received.

The process includes: the base station preconfigures the maximum receiving time T_SRS. If the base station receives no SRS from receiving the SRS last time to exceeding the configured maximum receiving time T_SRS, the base station considers that uplink out-of-synchronization has occurred.

In one embodiment, the process includes: if no SRS is received within the receiving time of N consecutive SRSs, the base station considers that uplink out-of-synchronization has occurred.

Application Scenario 9: The base station determines whether uplink out-of-synchronization occurs based on the path loss threshold.

Steps are as follows.

Step 1: The base station pre-configures a second path loss value threshold, denoted as LP1_Threshold.

Step 2: The base station calculates the second receiving power (denoted as $P\_1$) according to the received SRS at the moment T1. Then the second path loss value LP1_1 between the base station and the terminal at the moment T1 may be expressed as $P\_0-P\_1$, where $P\_0$ is the second sending power of the SRS.

Step 3: The base station compares the second path loss value LP1_1 at the moment T1 with the second path loss threshold LP1_Threshold.

For example, if LP1_1>LP1_Threshold, the uplink out-of-synchronization between the terminal and the base station occurs.

If LP1_1≤LP1_Threshold, the uplink synchronization between the terminal and the base station occurs.

Application Scenario 10: The base station determines whether uplink out-of-synchronization occurs based on the second RSRP threshold.

Steps are as follows.

Step 1: The base station pre-configures a second RSRP threshold, denoted as RSRP1_Threshold.

Step 2: The base station measures the fourth RSRP (denoted as RSRP1_1) of the received SRS at the moment T1.

Step 3: The base station compares the RSRP1_1 at the moment T1 with the second RSRP threshold RSRP1_Threshold.

For example, if RSRP1_1<RSRP1_Threshold, the uplink out-of-synchronization between the terminal and the base station occurs.

If RSRP1_1>RSRP1_Threshold, the uplink synchronization between the terminal and the base station occurs.

Application Scenario 11: The base station determines whether uplink out-of-synchronization occurs based on the second RSRP variation threshold of RSRP.

Steps are as follows.

Step 1: The base station pre-configures a second RSRP variation threshold of RSRP, denoted as RSRP1_Variation.

Step 2: Taking the moment when the base station receives the uplink SRS for the first time as a reference time point T0, the base station obtains the fifth RSRP (denoted as RSRP1_0) of the uplink SRS by measurement at T0.

Step 3: The base station measures the sixth RSRP (denoted as RSRP1_1) of the received SRS at the moment T1. Then the second RSRP variation of the RSRP measured by the base station within T1-T0 is RSRP1_1-RSRP1_0.

Step 4: The base station compares the measured value of the second RSRP variation RSRP1_1-RSRP1_0 with the second RSRP variation threshold RSRP1_Variation of RSRP.

For example, if RSRP1_1-RSRP1_0>RSRP1_Variation, the uplink out-of-synchronization between the terminal and the base station occurs.

If RSRP1_1-RSRP1_0≤RSRP1_Variation, the uplink synchronization between the terminal and the base station occurs.

Application Scenario 12: The base station actively determines that uplink synchronization occurs, considers that this positioning fails, and gives up this positioning.

Steps are as follows.

Step 1: The terminal performs an uplink positioning process, where there is no connection between the terminal and the base station at this time.

Step 2: When the base station detects uplink out-of-synchronization, the base station considers that the current positioning fails, and notifies the positioning server that the current positioning fails through the NRPPa protocol.

Step 3: In one embodiment, the base station may also notify the terminal in the INACTIVE state that the current positioning fails. Ways that can be taken is as follows.

In one embodiment, the base station sends a first paging message to the terminal, and the terminal initiates an RRC establishment process or an RRC recovery process after receiving the paging. The terminal enters the connected state after receiving an RRC establishment indication or recovery indication from the base station side. Afterwards, the base station sends a message to notify the terminal that the current positioning fails. After receiving the positioning failure notification, the terminal stops transmitting the SRS and discards the SRS configuration configured in the last positioning.

The above message is as follows.

In one embodiment, the base station notifies the terminal that the current positioning fails through the MAC CE carrying the second positioning failure indication.

In one embodiment, the base station notifies the terminal that the current positioning fails through the DCI carrying the second positioning failure indication.

In one embodiment, the base station notifies the terminal that the current positioning fails through an RRC message carrying the second positioning failure indication.

In one embodiment, the base station carries the second positioning failure indication in a paging message, and the terminal stops transmitting the SRS and discards the SRS configuration configured in the last positioning after receiving the paging message.

Step 4: The positioning server may also notify the terminal that the current positioning fails.

The process is as follows.

In one embodiment, after the positioning server obtains the positioning failure information, the positioning server notifies the AMF to initiate paging at the core network side, and carries the second positioning failure indication in the first paging message to the terminal, to notify the terminal that the current positioning fails. After receiving the corresponding indication, the terminal stops transmitting the SRS and discards the SRS configuration configured in the last positioning.

In one embodiment, after the positioning server obtains the positioning failure information, the positioning server may broadcast the pos-SIB and carry the second positioning failure indication in the broadcast pos-SIB to the terminal, to notify the terminal that the current positioning fails. After receiving the corresponding indication, the terminal stops transmitting the SRS and discards the SRS configuration configured in the last positioning.

Application Scenario 13: The base station actively determines that uplink out-of-synchronization occurs, and pages the terminal in the INACTIVE state to enter the connected state and then continue positioning.

Steps are as follows.

Step 1: The terminal performs an uplink positioning process, where there is no connection between the terminal and the base station at this time.

Step 2: The base station pages the terminal in the INACTIVE state after the base station detects uplink out-of-synchronization, and the terminal enters the connected state.

Step 3: The terminal actively initiates an RRC recovery process after receiving the first paging message.

Step 4: The terminal enters the connected state and completes uplink synchronization with the base station again when the terminal receives an RRC recovery message sent by the base station side. Afterwards, the terminal remains in the connected state and continues to transmit the SRS to complete the subsequent positioning process.

Figure 4:
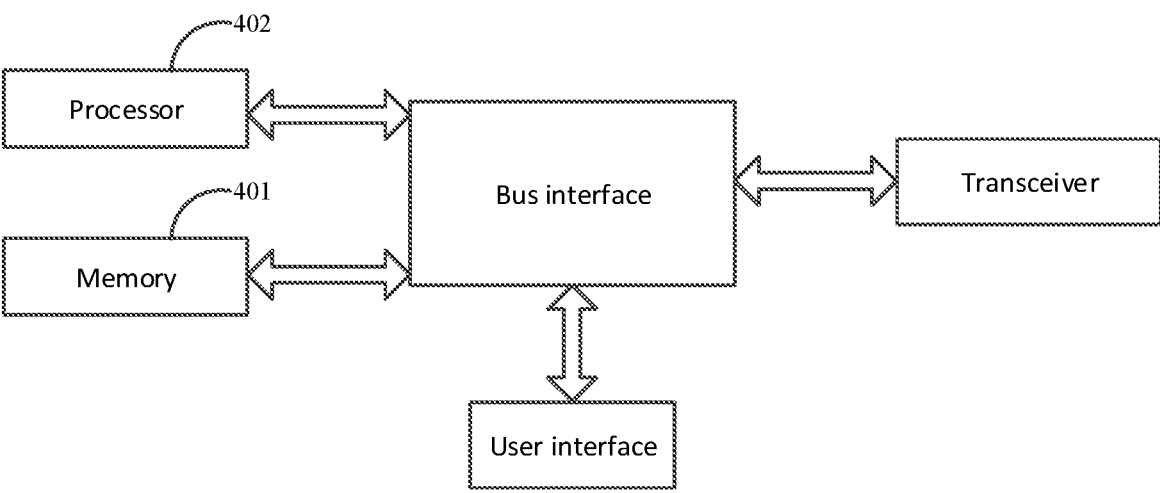
FIG. 4 is a schematic diagram of a physical architecture of a terminal in an embodiment of the disclosure.

In some embodiments, as shown in FIG. 4, embodiments of the disclosure provide a terminal, including:

a memory 401 configured to store an executable computer program; and a processor 402 configured to read the computer program in the memory 401 to:

obtain first channel state information of a transmission channel between the terminal and a base station when the terminal is in an IDLE state or INACTIVE state and is in a process of transmitting an uplink SRS to the base station for uplink positioning; and determine a synchronization state with the base station based on the first channel state information.

Here, in FIG. 4, the bus architecture may include any numbers of interconnected buses and bridges, and link various circuits of one or more processors represented by the processor 402 and one or more memories represented by the memory 401. The bus architecture may further link various other circuits such as peripheral device, voltage regulator and power management circuit, which are all well known in the art and thus will not be further described again herein. The bus interface provides an interface. The transceiver may be multiple elements, i.e., include a transmitter and a receiver, and provide the devices for communicating with various other devices over the transmission media. The processor 402 is responsible for managing the bus architecture and general processing, and the memory 401 may store the data used by the processor 402 when performing the operations.

In one embodiment, the processor 402 is further configured to:

re-establish synchronization with the base station and continue to transmit the SRS, or determine that positioning fails and generate a first positioning failure indication, or give up transmitting the SRS and wait for performing a processing result of the base station, if it is determined that uplink out-of-synchronization with the base station occurs.

In one embodiment, before obtaining the first channel state information of the transmission channel between the terminal and the base station, the processor 402 is further configured to:

obtain a first channel state threshold corresponding to the transmission channel, where the first channel state threshold includes at least one of a first path loss threshold, a first RSRP threshold or a first RSRP variation threshold.

In one embodiment, when obtaining the first channel state threshold of the transmission channel, the processor 402 is configured to:

obtain the pre-configured first channel state threshold from RRC information sent by the base station before transitioning from a connected state to the IDLE state or INACTIVE state; or pre-configure the first channel state threshold.

In one embodiment, when obtaining the first channel state information of the transmission channel between the terminal and the base station, and determining the synchronization state with the base station based on the first channel state information, the processor 402 is configured to:

if a first path loss value of the transmission channel is obtained, determine that uplink out-of-synchronization with the base station occurs when determining that the first path loss value is greater than the first path loss threshold; or if first RSRP of a downlink reference signal sent by the base station on the transmission channel is obtained, determine that uplink out-of-synchronization with the base station occurs when determining that the first RSRP does not reach the first RSRP threshold; or if a first RSRP variation of RSRP of the downlink reference signal sent by the base station on the transmission channel is obtained, determine that uplink out-of-synchronization with the base station occurs when determining that the first RSRP variation is greater than the first RSRP variation threshold.

In one embodiment, when obtaining the first path loss value of the transmission channel, the processor 402 is configured to:

determine first sending power of the downlink reference signal sent by the base station on the transmission channel;

determine first receiving power of the downlink reference signal received on the transmission channel; and determine the first path loss value of the transmission channel based on the first sending power and the first receiving power.

In one embodiment, when obtaining the first RSRP variation of the RSRP of the downlink reference signal sent by the base station on the transmission channel, the processor 402 is configured to:

determine second RSRP of the downlink reference signal sent by the base station on the transmission channel at a first moment, where the first moment is a moment to start transmitting the SRS to the base station;

determine third RSRP of the downlink reference signal sent by the base station on the transmission channel at a second moment, where the second moment is any moment after the first moment; and determine the corresponding first RSRP variation based on the second RSRP and the third RSRP.

In one embodiment, when re-establishing synchronization with the base station and continuing to transmit the SRS, the processor 402 is configured to:

initiate a random access process to the base station and obtain an updated TA value, to re-establish synchronization with the base station and continue to transmit the SRS after establishing synchronization, where the terminal does not enter a connected state in the random access process; or continue to transmit the SRS after establishing connection with the base station.

In one embodiment, after determining that positioning fails, the processor 402 is further configured to:

perform at least one of following operations:

stop transmitting the SRS;

discard SRS configuration information.

In one embodiment, after determining that positioning fails and generating the first positioning failure indication, the processor 402 is further configured to:

send the first positioning failure indication to the base station, and the base station sends the first positioning failure indication to a positioning server; or send the first positioning failure indication to the positioning server directly.

In one embodiment, when sending the first positioning failure indication to the base station, the processor 402 is configured to:

initiate a random access process to the base station, and send the first positioning failure indication carried in a random access process message 3 Msg3 or random access process message A MsgA in the random access process to the base station, where the terminal does not enter a connected state in the random access process; or send the first positioning failure indication to the base station through an RRC message or an MAC CE after establishing connection with the base station.

The above-mentioned memory 401 and processor 402 cooperate with each other to implement any method performed by the terminal in step 200 to step 201 in the above-mentioned embodiments, which will not be repeated here.

Figure 5:
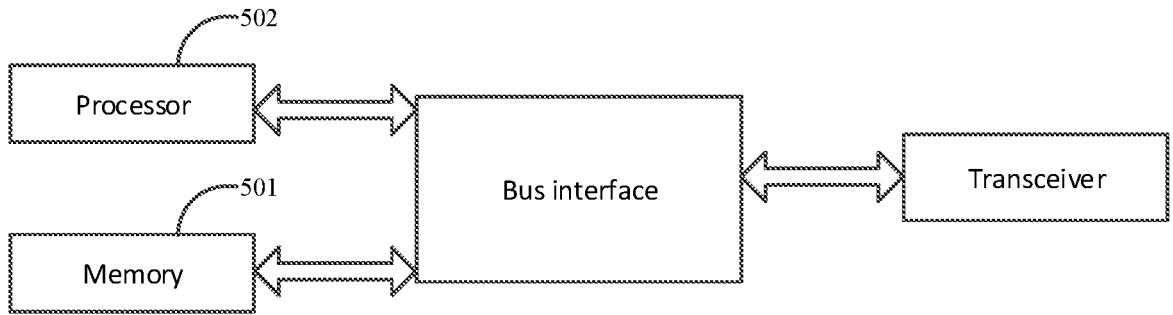
FIG. 5 is a schematic diagram of a physical architecture of a base station in an embodiment of the disclosure.

In some embodiments, as shown in FIG. 5, embodiments of the disclosure provide a base station, including:

a memory 501 configured to store an executable computer program; and a processor 502 configured to read the computer program in the memory 501 to:

determine a synchronization state with a terminal in an IDLE state or INACTIVE state in a process of receiving an uplink SRS transmitted by the terminal; and re-establish synchronization with the terminal in the INACTIVE state to continue receiving the SRS transmitted by the terminal, or determine that positioning fails and generate a second positioning failure indication, if it is determined that uplink out-of-synchronization with the terminal occurs.

Here, in FIG. 5, the bus architecture may include any numbers of interconnected buses and bridges, and link various circuits of one or more processors 502 represented by the processor 502 and one or more memories 501 represented by the memory 501. The bus architecture may further link various other circuits such as peripheral device, voltage regulator and power management circuit, which are all well known in the art and thus will not be further described again herein. The bus interface provides an interface. The transceiver may be multiple elements, i.e., include a transmitter and a receiver, and provide the devices for communicating with various other devices over the transmission media. The processor 502 is responsible for managing the bus architecture and general processing, and the memory 501 may store the data used by the processor 502 when performing the operations.

In one embodiment, when re-establishing synchronization with the terminal in the INACTIVE state to continue receiving the SRS transmitted by the terminal, the processor 502 is configured to:

continue receiving the SRS transmitted by the terminal after establishing connection with the terminal; or send a first paging message to the terminal, where the first paging message carries a TA value updated by the base station, and the terminal re-establishes synchronization with the base station based on the received TA value, and the terminal does not initiate a random access process and continues to transmit the SRS in the INACTIVE state after receiving the first paging message; or send a second paging message to the terminal and the terminal initiates a random access process and obtains an updated TA value to re-establish synchronization with the base station, and issue an RRC release indication and the terminal continues to transmit the SRS in the INACTIVE state; or send a third paging message to the terminal, where the third paging message carries an instruction to perform IDLE or INACTIVE uplink positioning, and the terminal initiates a random access process and obtains an updated TA value to re-establish synchronization with the base station, and the terminal continues to transmit the SRS in the INACTIVE state.

In one embodiment, after determining that current positioning fails and generating the second positioning failure indication, the processor 502 is configured to:

send the generated second positioning failure indication to the positioning server and/or the terminal in the INACTIVE state.

In one embodiment, when sending the second positioning failure indication to the terminal in the INACTIVE state, the processor 502 is configured to:

send the second positioning failure indication to the terminal to notify the terminal of positioning failure after establishing connection with the terminal; or send a fourth paging message carrying the second positioning failure indication to the terminal to notify the terminal of current positioning failure, and the terminal does not initiate a random access process and continues keeping in the INACTIVE state after receiving the fourth paging message.

In one embodiment, the processor 502 is further configured to:

send the second positioning failure indication to the terminal after establishing connection with the terminal, where the second positioning failure indication is sent in any one of following manners:

carrying the second positioning failure indication in an MAC CE;

carrying the second positioning failure indication in DCI;

carrying the second positioning failure indication in an RRC message.

The above-mentioned memory 501 and processor 502 cooperate with each other to implement any method performed by the base station in step 300 to step 301 in the above-mentioned embodiments, which will not be repeated here.

Figure 6:
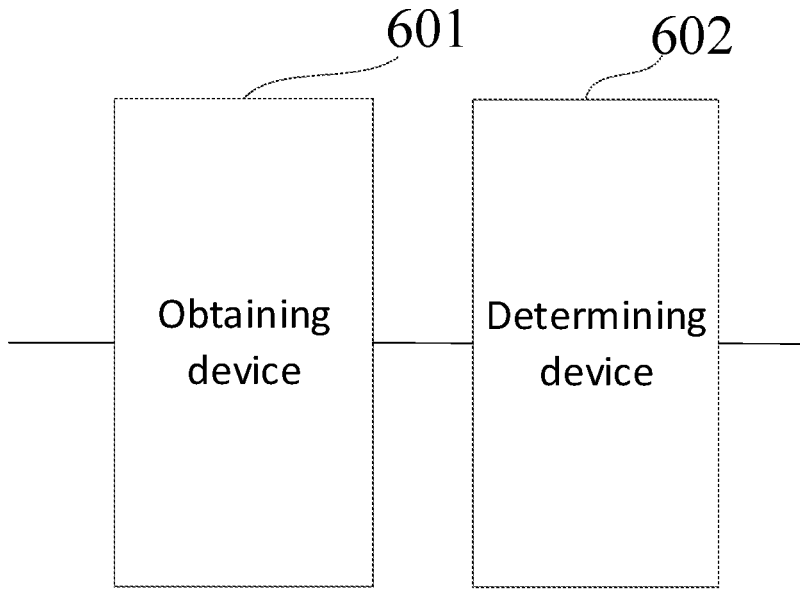
FIG. 6 is a schematic diagram of a logical architecture of a terminal in an embodiment of the disclosure.

Embodiments of the disclosure provide a terminal, as shown in FIG. 6, including:

an obtaining device 601 configured to obtain first channel state information of a transmission channel between the terminal and a base station in a process of transmitting an uplink SRS to the base station for uplink positioning in an IDLE state or INACTIVE state; and a determining device 602 configured to determine a synchronization state with the base station based on the first channel state information.

The above-mentioned obtaining device 601 and determining device 602 cooperate with each other to implement any method performed by the terminal in step 200 to step 201 in the above-mentioned embodiments, which will not be repeated here.

Figure 7:
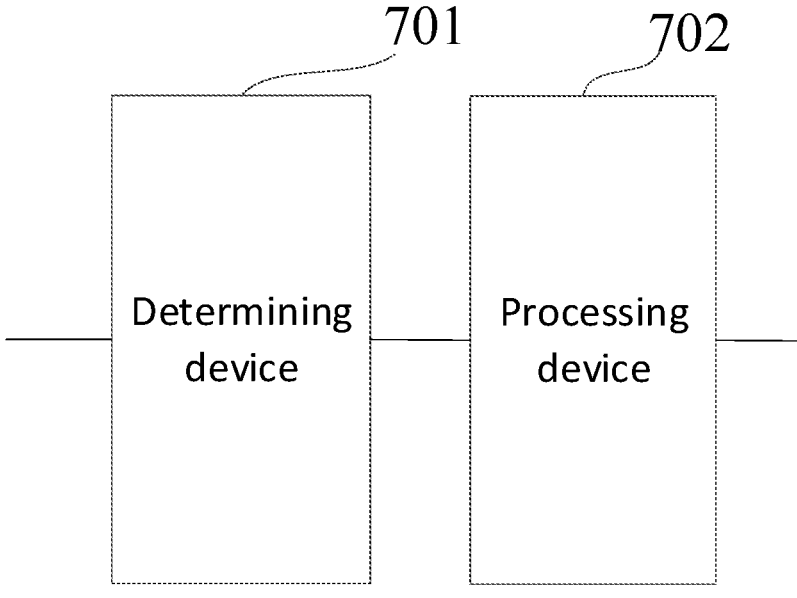
FIG. 7 is a schematic diagram of a logical architecture of a base station in an embodiment of the disclosure.

Embodiments of the disclosure provide a base station, as shown in FIG. 7, including:

a determining device 701 configured to determine a synchronization state with a terminal in an IDLE state or INACTIVE state in a process of receiving an uplink SRS transmitted by the terminal; and a processing device 702 configured to re-establish synchronization with the terminal in the INACTIVE state to continue receiving the SRS transmitted by the terminal, or determine that positioning fails and generate a second positioning failure indication, if it is determined that uplink out-of-synchronization with the terminal occurs.

The above-mentioned determining device 701 and processing device 702 cooperate with each other to implement any method performed by the base station in step 300 to step 301 in the above-mentioned embodiments, which will not be repeated here.

Embodiments of the disclosure provide a computer readable storage medium, where instructions in the storage medium, when executed by a processor, enable the processor to perform the method performed by the terminal.

Embodiments of the disclosure provide a computer readable storage medium, where instructions in the storage medium, when executed by a processor, enable the processor to perform the method performed by the base station.

To sum up, in the embodiments of the disclosure, when the terminal in the IDLE state or INACTIVE state transmits the SRS to the base station for uplink positioning, the terminal or the base station can obtain the channel state information of the transmission channel between the terminal and the base station, and detect the synchronization state between the terminal that is performing uplink positioning in the IDLE state or INACTIVE state and the base station based on the channel state information. When detecting the uplink out-of-synchronization, the terminal or the base station can take corresponding processing approaches to continue to guarantee the subsequent IDLE/INACTIVE positioning process.

The embodiments of the disclosure can be provided as methods, systems and computer program product systems. Thus the disclosure can take the form of hardware embodiments alone, software embodiments alone, or embodiments combining the software and hardware aspects. Also the disclosure can take the form of a computer program product system implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program product systems according to the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A synchronization state processing method, comprising:

obtaining, by a terminal in an IDLE state or INACTIVE state, first channel state information of a transmission channel between the terminal and a base station in a process of transmitting an uplink Sounding Reference Signal (SRS) to the base station for uplink positioning; and determining, by the terminal, a synchronization state with the base station based on the first channel state information;

wherein said obtaining, by the terminal, the first channel state information of the transmission channel between the terminal and the base station, and determining the synchronization state with the base station based on the first channel state information, comprises:

when the terminal obtains a first path loss value of the transmission channel, determining that uplink out-of-synchronization with the base station occurs when determining that the first path loss value is greater than a first path loss threshold; or when the terminal obtains first Reference Signal Receiving Power (RSRP) of a downlink reference signal sent by the base station on the transmission channel, determining that uplink out-of-synchronization with the base station occurs when determining that the first RSRP does not reach a first RSRP threshold; or when the terminal obtains a first Reference Signal Receiving Power (RSRP) variation of RSRP of the downlink reference signal sent by the base station on the transmission channel, determining that uplink out-of-synchronization with the base station occurs when determining that the first RSRP variation is greater than a first RSRP variation threshold.

2. The method according to claim 1, further comprising:

if the terminal determines that uplink out-of-synchronization with the base station occurs:

re-establishing, by the terminal, synchronization with the base station and continuing to transmit the SRS; or determining, by the terminal, that positioning fails and generating a first positioning failure indication; or giving up, by the terminal, transmitting the SRS and waiting for performing a processing result of the base station.

3. The method according to claim 1, wherein before the terminal obtains the first channel state information of the transmission channel between the terminal and the base station, the method further comprises:

obtaining, by the terminal, a first channel state threshold corresponding to the transmission channel;

wherein the first channel state threshold comprises at least one of: the first path loss threshold, the first RSRP threshold, or the first RSRP variation threshold.

4. The method according to claim 3, wherein said obtaining, by the terminal, the first channel state threshold of the transmission channel, comprises:

obtaining, by the terminal, the pre-configured first channel state threshold from Radio Resource Control (RRC) information sent by the base station before transitioning from a connected state to the IDLE state or INACTIVE state; or pre-configuring, by the terminal, the first channel state threshold.

5. The method according to claim 2, wherein said re-establishing, by the terminal, synchronization with the base station and continuing to transmit the SRS, comprises:

initiating, by the terminal, a random access process to the base station and obtaining an updated Timing Advance (TA) value, to re-establish synchronization with the base station and continue to transmit the SRS after establishing synchronization, wherein the terminal does not enter a connected state in the random access process; or continuing, by the terminal, to transmit the SRS after establishing connection with the base station.

6. The method according to claim 2, wherein after the terminal determines that positioning fails, the method further comprises:

performing, by the terminal, at least one of following operations:

stopping, by the terminal, transmitting the SRS; or discarding, by the terminal, SRS configuration information.

7. The method according to claim 2, wherein after the terminal determines that positioning fails and generates the first positioning failure indication, the method further comprises:

sending, by the terminal, the first positioning failure indication to the base station, and the base station sends the first positioning failure indication to a positioning server; or sending, by the terminal, the first positioning failure indication to the positioning server directly;

wherein said sending, by the terminal, the first positioning failure indication to the base station, comprises:

initiating, by the terminal, a random access process to the base station, and sending the first positioning failure indication carried in a four-step random access process message 3 (Msg3) or two-step random access process message A (MsgA) in the random access process to the base station, wherein the terminal does not enter a connected state in the random access process; or sending, by the terminal, the first positioning failure indication to the base station through a Radio Resource Control (RRC) message or a Medium Access Control Control Element (MAC CE) after establishing connection with the base station.

8. A synchronization state processing method, comprising:

determining, by a base station, a synchronization state with a terminal in a process of receiving an uplink Sounding Reference Signal (SRS) transmitted by the terminal, wherein the terminal is in an IDLE state or INACTIVE state; and re-establishing, by the base station, synchronization with the terminal in the INACTIVE state to continue receiving the SRS transmitted by the terminal, or determining that positioning fails and generating a second positioning failure indication, when it is determined that uplink out-of-synchronization with the terminal occurs;

wherein said determining, by the base station, the synchronization state with the terminal in the process of receiving the uplink SRS transmitted by the terminal comprises:

obtaining, by the base station, second channel state information of a transmission channel between the base station and the terminal based on the received SRS; and determining, by the base station, the synchronization state with the terminal based on the second channel state information;

wherein said determining, by the base station, the synchronization state with the terminal based on the second channel state information comprises:

when the base station receives no SRS within a preconfigured maximum receiving time window, determining, by the base station, that uplink out-of-synchronization with the terminal occurs; or when the base station obtains a second path loss value of the transmission channel and the second path loss value is greater than a set second path loss threshold, determining, by the base station, that uplink out-of-synchronization with the terminal occurs; or when the base station obtains a fourth Reference Signal Receiving Power (RSRP) of the SRS transmitted by the terminal on the transmission channel and the fourth RSRP does not reach a set second RSRP threshold, determining, by the base station, that uplink out-of-synchronization with the terminal occurs; or when the base station obtains a second Reference Signal Receiving Power (RSRP) variation of the RSRP of the SRS transmitted by the terminal on the transmission channel and the second RSRP variation is greater than a set second RSRP variation threshold, determining, by the base station, that uplink out-of-synchronization with the terminal occurs.

9. The method according to claim 8, wherein said re-establishing, by the base station, synchronization with the terminal in the INACTIVE state to continue receiving the SRS transmitted by the terminal, comprises:

continuing, by the base station, receiving the SRS transmitted by the terminal after establishing connection with the terminal; or sending, by the base station, a first paging message to the terminal, wherein the first paging message carries a Timing Advance (TA) value updated by the base station, and the terminal re-establishes synchronization with the base station based on the received TA value, and the terminal does not initiate a random access process and continues to transmit the SRS in the INACTIVE state after receiving the first paging message; or sending, by the base station, a second paging message to the terminal and the terminal initiates a random access process and obtains an updated TA value to re-establish synchronization with the base station, and issuing, by the base station, a Radio Resource Control (RRC) release indication and the terminal continues to transmit the SRS in the INACTIVE state; or sending, by the base station, a third paging message to the terminal, wherein the third paging message carries an instruction to perform IDLE or INACTIVE uplink positioning, and the terminal initiates a random access process and obtains an updated TA value to re-establish synchronization with the base station, and the terminal continues to transmit the SRS in the INACTIVE state.

10. The method according to claim 8, wherein after the base station determines that positioning fails and generates the second positioning failure indication, the method further comprises:

sending, by the base station, the generated second positioning failure indication to a positioning server and/or the terminal in the INACTIVE state;

wherein said sending, by the base station, the second positioning failure indication to the terminal in the INACTIVE state, comprises:

sending, by the base station, the second positioning failure indication to the terminal to notify the terminal of positioning failure after establishing connection with the terminal; or sending, by the base station, a fourth paging message carrying the second positioning failure indication to the terminal to notify the terminal of positioning failure, and the terminal does not initiate a random access process and continues keeping in the INACTIVE state after receiving the fourth paging message.

11. The method according to claim 10, further comprising:

sending, by the base station, the second positioning failure indication to the terminal after establishing connection with the terminal, wherein the base station sends the second positioning failure indication in any one of following manners:

carrying, by the base station, the second positioning failure indication in a Medium Access Control Control Element (MAC CE);

carrying, by the base station, the second positioning failure indication in Downlink Control Information (DCI); or carrying, by the base station, the second positioning failure indication in a Radio Resource Control (RRC) message.

12. A terminal, comprising:

a memory configured to store an executable computer program; and a processor configured to read the executable computer program in the memory to:

obtain first channel state information of a transmission channel between the terminal and a base station when the terminal is in an IDLE state or INACTIVE state and in a process of transmitting an uplink Sounding Reference Signal (SRS) to the base station for uplink positioning; and determine a synchronization state with the base station based on the first channel state information;

wherein when obtaining the first channel state information of the transmission channel between the terminal and the base station, and determining the synchronization state with the base station based on the first channel state information, the processor is configured to:

when a first path loss value of the transmission channel is obtained, determine that uplink out-of-synchronization with the base station occurs when determining that the first path loss value is greater than a first path loss threshold; or when first RSRP of a downlink reference signal sent by the base station on the transmission channel is obtained, determine that uplink out-of-synchronization with the base station occurs when determining that the first RSRP does not reach a first RSRP threshold; or when a first RSRP variation of RSRP of the downlink reference signal sent by the base station on the transmission channel is obtained, determine that uplink out-of-synchronization with the base station occurs when determining that the first RSRP variation is greater than a first RSRP variation threshold.

13. The terminal according to claim 12, wherein before obtaining the first channel state information of the transmission channel between the terminal and the base station, the processor is further configured to:

obtain a first channel state threshold corresponding to the transmission channel, wherein the first channel state threshold comprises at least one of the first path loss threshold, the first RSRP threshold or the first RSRP variation threshold.

14. The terminal according to claim 13, wherein when obtaining the first channel state threshold of the transmission channel, the processor is configured to:

obtain the pre-configured first channel state threshold from RRC information sent by the base station before transitioning from a connected state to the IDLE state or INACTIVE state; or pre-configure the first channel state threshold.

15. The terminal according to claim 12, wherein the processor is further configured to:

re-establish synchronization with the base station and continue to transmit the SRS, or determine that positioning fails and generate a first positioning failure indication, or give up transmitting the SRS and wait for performing a processing result of the base station, when it is determined that uplink out-of-synchronization with the base station occurs; and after determining that positioning fails, the processor is further configured to:

perform at least one of following operations:

stop transmitting the SRS; or discard SRS configuration information.

16. A base station, comprising:

a memory configured to store an executable computer program; and a processor configured to read the executable computer program in the memory to perform the synchronization state processing method according to claim 8.

17. A non-transitory computer readable storage medium, wherein instructions in the non-transitory computer readable storage medium, when executed by a processor, cause the processor to perform the method according to claim 1.

18. A non-transitory computer readable storage medium, wherein instructions in the storage medium, when executed by a processor, enable the processor to perform the method according to claim 8.

19. The terminal according to claim 12, wherein the processor is further configured to:

re-establish synchronization with the base station and continue to transmit the SRS, or determine that positioning fails and generate a first positioning failure indication, or give up transmitting the SRS and wait for performing a processing result of the base station, when it is determined that uplink out-of-synchronization with the base station occurs.

20. The terminal according to claim 19, wherein when re-establishing synchronization with the base station and continuing to transmit the SRS, the processor is configured to:

initiate a random access process to the base station and obtain an updated Timing Advance (TA) value, to re-establish synchronization with the base station and continue to transmit the SRS after establishing synchronization, wherein the terminal does not enter a connected state in the random access process; or continue to transmit the SRS after establishing connection with the base station.

\* \* \* \* \*